United States Patent
Kosiba et al.

(10) Patent No.: US 8,359,222 B2
(45) Date of Patent: Jan. 22, 2013

(54) SYSTEM AND METHOD FOR GENERATING FORECASTS AND ANALYSIS OF CONTACT CENTER BEHAVIOR FOR PLANNING PURPOSES

(75) Inventors: Eric D. Kosiba, Crofton, MD (US); Douglas G. Newhard, Crofton, MD (US); Neofytos C. Papadopoulos, Annapolis, MD (US)

(73) Assignee: Bay Bridge Technologies, Inc., Annapolis, MD (US)

( * ) Notice: Subject to any disclaimer, the term of this patent is extended or adjusted under 35 U.S.C. 154(b) by 0 days.

(21) Appl. No.: 13/245,463

(22) Filed: Sep. 26, 2011

(65) Prior Publication Data

US 2012/0016712 A1    Jan. 19, 2012

Related U.S. Application Data

(63) Continuation of application No. 10/984,841, filed on Nov. 10, 2004, now Pat. No. 8,046,254, which is a continuation of application No. 10/146,894, filed on May 17, 2002, now Pat. No. 7,103,562.

(60) Provisional application No. 60/291,325, filed on May 17, 2001.

(51) Int. Cl.
*G06Q 10/00* (2012.01)

(52) U.S. Cl. ...................................... 705/7.17; 705/7.38

(58) Field of Classification Search .................. 705/7.17
See application file for complete search history.

(56) References Cited

U.S. PATENT DOCUMENTS

| | | | |
|---|---|---|---|
| 5,185,780 | A | 2/1993 | Leggett |
| 5,325,292 | A | 6/1994 | Crockett |
| 5,652,791 | A | 7/1997 | Sunderman et al. |
| 5,712,985 | A | 1/1998 | Lee et al. |
| 5,903,641 | A | 5/1999 | Tonisson |
| 5,911,134 | A | 6/1999 | Castonguay et al. |
| 5,918,207 | A | 6/1999 | McGovern et al. |
| 5,978,465 | A | 11/1999 | Corduroy et al. |
| 6,005,932 | A | 12/1999 | Bloom |
| 6,044,355 | A | 3/2000 | Crockett et al. |
| 6,058,370 | A | 5/2000 | Church et al. |
| 6,075,848 | A | 6/2000 | Lunn et al. |
| 6,098,052 | A | 8/2000 | Kosiba et al. |
| 6,205,412 | B1 | 3/2001 | Barskiy et al. |
| 6,263,049 | B1 | 7/2001 | Kuhn |
| 6,278,777 | B1 | 8/2001 | Morley et al. |

(Continued)

FOREIGN PATENT DOCUMENTS

JP          406324919 A    11/1994

(Continued)

OTHER PUBLICATIONS

Blue Pumpkin Planner Product Brief.

(Continued)

*Primary Examiner* — Andre Boyce
(74) *Attorney, Agent, or Firm* — Ice Miller LLP

(57) ABSTRACT

A method of predicting expected performance of a processing center system is provided. The method includes receiving performance information from a performance monitoring system associated with the processing center system. A computer model of the processing center system is developed based on the performance information. The method further includes generating predictions based on the computer model, and analyzing the predictions to generate performance scenarios for the processing center system.

34 Claims, 13 Drawing Sheets

U.S. PATENT DOCUMENTS

| | | | |
|---|---|---|---|
| 6,324,282 B1 | 11/2001 | McIllwaine et al. | |
| 6,330,326 B1 | 12/2001 | Whitt | |
| 6,333,979 B1 | 12/2001 | Bondi et al. | |
| 6,366,666 B2 | 4/2002 | Bengtson et al. | |
| 6,466,664 B1 | 10/2002 | Zhao | |
| 6,584,191 B1 | 6/2003 | McPartlan et al. | |
| 6,639,982 B1 | 10/2003 | Stuart et al. | |
| 6,711,253 B1 | 3/2004 | Prabhaker | |
| 6,744,878 B1 * | 6/2004 | Komissarchik et al. | 379/265.03 |
| 2002/0049687 A1 | 4/2002 | Helsper et al. | |
| 2002/0052770 A1 | 5/2002 | Podrazhansky | |
| 2002/0143599 A1 | 10/2002 | Nourbakhsh et al. | |

FOREIGN PATENT DOCUMENTS

WO  2001061594 A8  8/2001

OTHER PUBLICATIONS

Makuch et al., "Managing Consumer Credit Delinquency in the US Economy: A Multi-Billion Dollar Management Science Application," Interfaces 22:1, Jan.-Feb. 1992 (90-109).

"Repeat/ICCM '99 Exhibitor Profiles A to Z; Conference and Exposition to be held Aug. 30 to Sep. 2 in Chicago, Part 3 of 4," Business Wire, New York; Aug. 27, 1999; Business Editors/High-Tech Writers ICCM 99.

* cited by examiner

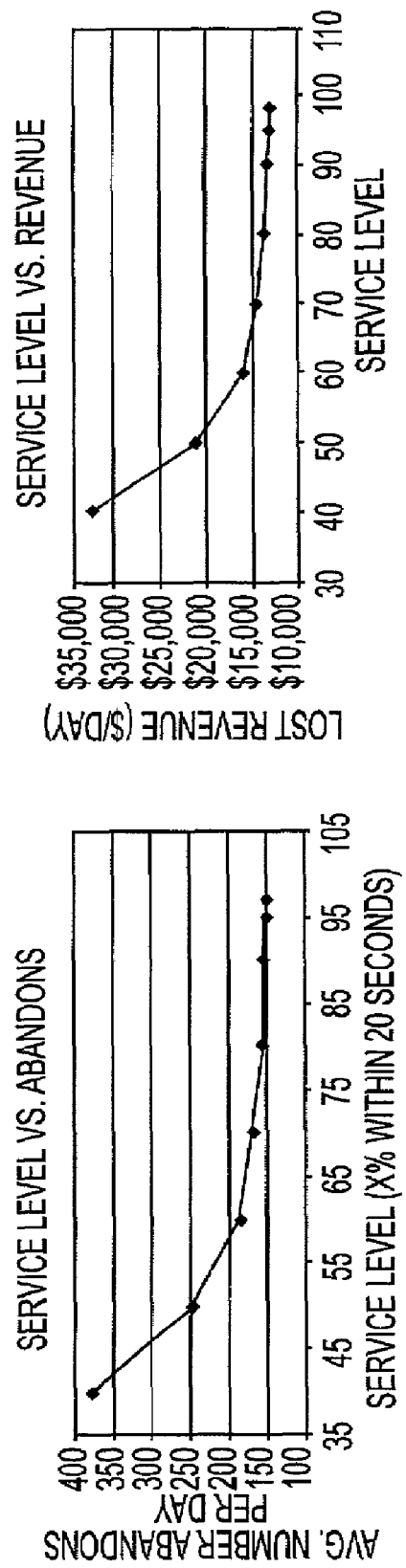

SYSTEM AND METHOD FOR GENERATING FORECASTS AND ANALYSIS OF CONTACT CENTER BEHAVIOR FOR PLANNING PURPOSES

CROSS-REFERENCE TO RELATED APPLICATIONS

This application is a continuation application of U.S. application Ser. No. 10/984,841, filed on Nov. 10, 2004, now U.S. Pat. No. 8,046,254, and titled SYSTEM AND METHOD FOR GENERATING FORECASTS AND ANALYSIS OF CONTACT CENTER BEHAVIOR FOR PLANNING PURPOSES, which is a continuation of U.S. application Ser. No. 10/146,894 filed on May 17, 2002, now U.S. Pat. No. 7,103,562, and titled SYSTEM AND METHOD FOR GENERATING FORECASTS AND ANALYSIS OF CONTACT CENTER BEHAVIOR FOR PLANNING PURPOSES, which claims the benefit of U.S. Provisional Application No. 60/291,325, filed May 17, 2001, and titled CALL CENTER RESOURCE ANALYSIS SYSTEM. The disclosure of the prior applications are considered part of and are incorporated by reference in the disclosure of this application.

TECHNICAL FIELD

The present invention relates generally to computerized systems and methods used for planning and analysis of complex physical systems, and more particularly to a system and method for generating forecasts and analysis of contact processing center behavior for planning purposes.

BACKGROUND

Methods for forecasting, planning, and analysis for contact processing centers are important for increasing the efficiency of contact processing centers. These methods may include regression modeling, queuing equation modeling, and discrete-event simulation modeling. However, all of these methods are either of limited applicability, unacceptably inaccurate, or difficult to use for contact center forecasting, planning, and analysis.

Regression methods predict contact center behavior based on the behavior observed in the historical dataset used to build the regression model. As a result, regression is best suited to large contact centers with stable workflows, consistent customer behavior, and slowly changing or invariant contact volumes. However, contact centers with these characteristics are rare, so the utility of regression is limited. In addition, because regression is only generally accurate when workflows are stable, regression cannot be used to conduct many kinds of analysis necessary for effective contact center management (e.g., understanding the impacts of center expansion, consolidation, or process-changing technology investments).

Queuing equation-based methods (generally embedded in contact center workforce management systems) are the most widely used methods for forecasting, planning, and analysis in contact centers. While workforce management systems are primarily used for short-term scheduling and personnel management, they can also be employed for forecasting, planning, and analysis purposes.

Workforce management systems generally include methods for forecasting workloads as well as automatic and manual methods for assigning employees to work-shifts in order to meet service quality goals. In these systems, queuing equations are used to estimate the personnel (i.e., agents or servers) required for each hour of the day to service a given workload. The most widely used queuing equations in contact centers are the so-called "Erlang" equations.

However, workforce management systems, and the Erlang equations that drive them, are deficient when used for planning and analysis purposes for two main reasons. First, Erlang equations require simplifying assumptions that are not appropriate in modern contact centers, and that result in inaccurate forecasts of center behavior. Second, since workforce management systems are not designed for forecasting, planning, and analysis, using them for these functions is cumbersome and time-consuming.

Erlang equations require three significant simplifying assumptions that limit their forecast accuracy. First, the Erlang equations assume no callers abandon i.e., they assume that no caller hangs up if forced to wait an excessive amount of time for an agent. This assumption can lead to gross inaccuracies in forecast performance under certain conditions. In addition, since the number of abandons has a direct bearing on the enterprise's revenue and customer satisfaction, the use of forecast methods that ignore abandons makes it difficult to properly manage and improve the revenue and customer satisfaction performance of the enterprise.

Second, Erlang assumes all contacts are handled in the same way, ignoring any tailored contact center workflows and contact routing strategies. However, such simple configurations are no longer realistic given advancements in contact center technology such as interactive voice response units (IVRs), "virtual queues", load balancing, and skill-based routing. This assumption can also lead to gross inaccuracies in forecast performance under certain conditions.

Third, Erlang equations do not calculate contact center sales, profit, and other metrics. Because of this limitation, contact center managers currently typically base their forecasts, plans, and management strategy on metrics (e.g., service level) that have little relation to the ultimate profitability of their businesses. This curious aspect of contact center management has arisen simply because the limitations of the analytic tools currently available.

In addition to the limitations associated with their Erlang-based forecasting methods, the usefulness of workforce management systems for forecasting, planning, and analysis is limited because they are designed for short-term tactical workforce scheduling and employee management purposes. Current systems do not easily support the rapid evaluation of strategic business issues such as sizing new contact centers, consolidating contact centers, determining the effect on profit and sales of hiring decisions, or developing contact center budgets and staff plans. Additionally, current systems use methodologies that do not allow for easy calculation of the distribution of customer experience (i.e., the proportions of the customer base that experiences differing levels of service quality) and the distribution of contact center performance. Finally, workforce management systems are not designed for iterative "what-if" analysis of the impact of changes in resource levels and service quality goals on staffing requirements, cost, and profit. Using these systems for scenario analysis is cumbersome and slow.

Techniques for building discrete-event simulations of contact center processing operations for planning and analysis purposes are also known. Such methods allow analysts to build a model of the contact center to estimate the impact on center performance of changes to performance drivers (e.g., call arrivals, staffing levels, and call routing policies).

These techniques to build discrete-event simulations can be useful for doing "one-off" analyses (such as center consolidation), but have severe practical disadvantages in dayto-day use. Typically, these techniques suffer from drawbacks opposite to those of queuing-based methods. While queuing-based methods are fast, easy to use, but overly simplistic, simulation systems are, in contrast, typically precise and flexible (e.g., they can be customized to the specific configuration and routing strategies of the contact center) but complex to develop, difficult to use, and too computationally slow for budget and staff planning For example, developing "what-if" analysis using simulation models is tedious, as each set of input parameters is typically manually entered into the model, the model run (which may take several hours or more) and the results evaluated.

Given the current limitations of the existing techniques, workforce and financial planners need a system that can easily produce accurate staff and budget plans as well as comprehensive contact center behavioral analysis.

SUMMARY

In one general aspect, a method of predicting expected performance of a processing center system includes receiving performance information from a performance monitoring system associated with the processing center system and developing a computer model of the processing center system based on the performance information. The method also includes generating predictions based on the computer model, and analyzing the predictions to generate performance scenarios for the processing center system.

Implementations may include one or more of the following features. For example, the method may include updating the computer model at predetermined intervals with at least one of behavior distributions, resource distributions, process demand forecasts, and process parameters. Analyzing the predictions may include interactively analyzing the predictions to develop at least one of resource plans, process analysis, tradeoff analysis, trend analysis, multiple scenario analysis, sensitivity analysis, forecast accuracy analysis, financial plans, and reports. Analyzing the predictions also may include iteratively analyzing the predictions to develop at least one of resource plans, process analysis, tradeoff analysis, trend analysis, multiple scenario analysis, sensitivity analysis, forecast accuracy analysis, financial plans, and reports.

The method may further include modifying the computer model, generating new predictions based on the modified computer model, analyzing the new predictions to generate new performance scenarios, and performing comparisons among the new performance scenarios. The method also may include generating a graphical analysis of at least one of the predictions and the performance scenarios.

The method may include using the predictions to generate multiple performance scenarios and executing comparisons among the multiple performance scenarios to evaluate alternative resource levels and process parameters.

The method may include generating a report describing the performance scenarios for electronic distribution. Alternatively, the method includes generating a report describing the performance scenarios for web publication.

The method may include using the predictions to allocate resources over a predetermined time period. The predetermined time period may include one of minutes, hours, days, weeks, months and years.

As part of the method, receiving performance information may include processing the performance information to estimate an expected distribution of resources by time period. Receiving performance information also may include processing the performance information to estimate an expected process demand by time period. Receiving performance information also may include processing the performance information to estimate expected behavior distributions.

The method may include predicting process performance metrics of the processing center system and using the process performance metrics to perform one of resource planning and process analysis. The process performance metrics may include one of process quality, revenue, cost, and profit.

The method may include predicting process performance metrics of the processing center system and using the process performance metrics to generate employee schedules.

The method may include processing the predictions using a process to generate an optimal resource plan. The process may be a mathematical optimization process, a heuristic process, or an algorithmic process.

In another general aspect, a method of predicting expected performance metrics of a contact center system includes receiving performance history information from a performance monitoring system associated with the contact center system and developing a computer model of the contact center system based on the performance history information. The method also includes generating multiple predictions based on the computer model, and analyzing the multiple predictions to generate performance scenarios for the contact center system.

Implementations may include one or more of the following features. For example, analyzing the multiple predictions may include analyzing the multiple predictions over a predetermined planning horizon.

The method may further include modifying the computer model, generating new predictions based on the modified computer model, analyzing the new predictions to generate new performance scenarios, and performing comparisons among the new performance scenarios. The method may include generating a graphical analysis of at least one of the predictions and the performance scenarios.

The method may include using the predictions to generate multiple performance scenarios and executing comparisons among the multiple performance scenarios to evaluate alternative resource levels and process parameters.

As part of this implementation, receiving performance history information may include processing the performance history information to estimate an expected distribution of resources by time period. Receiving performance history information may include processing the performance history information to estimate an expected process demand by time period. Receiving performance history information also may include processing the performance history information to estimate expected behavior distributions.

The method may include predicting process performance metrics of the processing center system and using the process performance metrics to perform one of resource planning and process analysis. The process performance metrics include one of process quality, revenue, cost, and profit.

The method may include predicting process performance metrics of the processing center system and using the process performance metrics to generate employee schedules.

The method also may include processing the predictions using a process to generate an optimal resource plan. The process may include a mathematical optimization process, a heuristic process, or an algorithmic process.

In another general aspect, a method employing simulation modeling for producing resource and performance plans for a processing operation includes receiving performance information from a performance monitoring system associated with the processing operation, developing a computer model of the processing operation based on the performance information, and using the computer model to generate expected performance metrics of the processing operation over a predetermined range of inputs. The method also includes storing the expected performance metrics and the range of inputs in a performance database, and accessing the performance database and analyzing the expected performance metrics for producing the resource and performance plans.

In another general aspect, a system to predict expected performance of a contact center includes a performance monitoring system associated with the contact center system. The performance monitoring system is operable to generate performance information. The system also includes a processor configured to develop a computer model of the contact center system based on the performance information, generate predictions based on the computer model, and analyze the predictions to generate performance scenarios for the processing center system.

Other features and advantages will be apparent from the description, the drawings, and the claims.

DESCRIPTION OF DRAWINGS

FIGS. 13A-13B show exemplary graphs that may be generated by executing a reverse analysis process.

Like reference symbols in the various drawings indicate like elements.

DETAILED DESCRIPTION

Implementations of the present system and method rapidly generate computer simulated performance forecasts, resource plans, and behavioral analysis in an environment in which there is a varying workload by time of day, day of week, inter-week and inter-month, and a varying number of resources by time of day, day of week, inter-week and inter-month. One such environment is a processing center system such as a contact center or group of interconnected contact centers forming a contact center system, where resources (e.g. phone agents, phone lines, and time allocated per contact) respond to and handle contacts, such as sales and customer service calls, web chat, or e-mail inquiries. For the remainder of this detailed description, the contact center example is used to illustrate one exemplary implementation of the invention but is not meant to limit its application.

Figure 1:
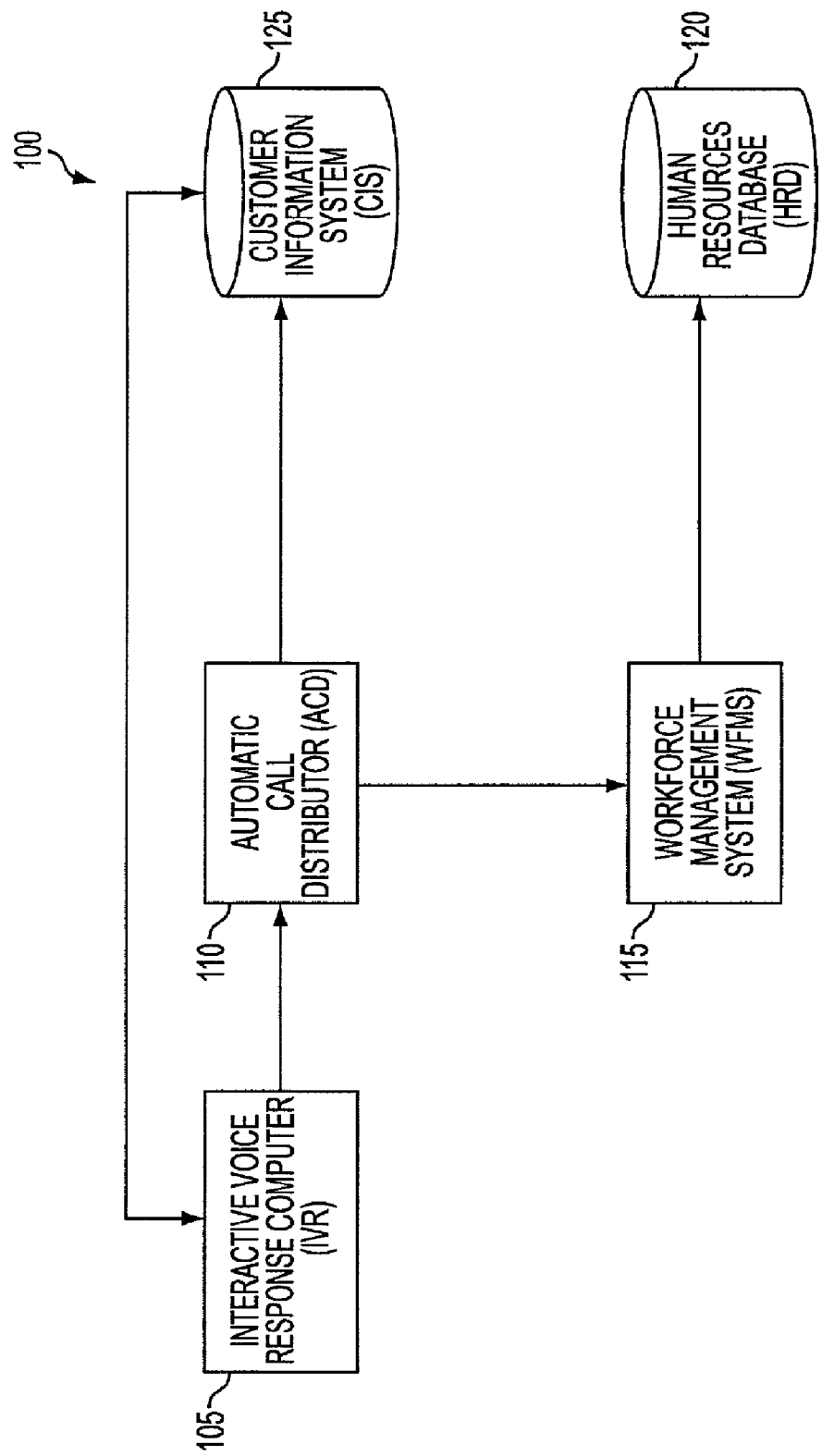
FIG. 1 shows an exemplary contact center computing environment.

Referring to FIG. 1, a typical contact center computing environment 100 known in the prior art includes an interactive voice response computer (IVR) 105, an automatic call distributor (ACD) 110, a workforce management system (WFMS) 115, a human resources database (HRD) 120, and a customer information system (CIS) 125. The computing environment of some contact centers may vary from the computing environment 100 in that the data systems in the environment may be combined and the infrastructure configuration may differ. Nevertheless, the function of the systems and the type of data residing in these other computing environments is consistent with that residing in the computing environment 100, and therefore, the following discussion will also apply to these other environments.

The IVR 105 is an automated voice response system that is activated when a call is received by the contact center. The IVR 105 provides a variety of options to a caller that are used to determine the purpose of the call and that are ultimately used to route the call to the appropriate resource. The IVR 105 also may obtain the caller's account or customer number (if one is available) and accesses the CIS 125 to determine how this caller should be treated based on the caller's account information (e.g., exposed to a tailored advertisement or, if a particularly good customer, routed to the best agent). The IVR sends the time called, the account number, the options chosen, and other data to the ACD 110 and to the CIS 125.

The ACD 110 automatically distributes the incoming calls to available resources (e.g., phone agents and phone lines). The ACD 110 also sends call interval data to the WFMS 115 (i.e., call data summarized by a particular unit of time, such as by half-hour). The call interval data includes, for each interval, call volume (e.g., 400 calls), number of phone agents available, number of phone agents occupied by handling calls, average handle time (e.g., 2 minutes), number of abandons, the mean time to abandon, the average wait time, service level (e.g. of the proportion of calls answered in less than or equal to a specified number of seconds (e.g. 80% within 20 seconds), and the average call duration. The ACD 110 also sends call-by-call data to the CIS 125. The call-by-call data includes the wait time of the call, the employee that handled the call, the handle time of the call, the time to abandon (if applicable), the amount of after call work or casework required, and details on the customer order, purchases, or other activity (if applicable).

WFMS 115 forecasts contact volumes and handle times and develops employee schedules in such a manner that resources are available to answer or process the incoming flow of contacts. The WFMS 115 uses generic forecasting techniques such as moving averages or autoregressive integrated moving average (ARIMA) models to predict, for any future day, the number of contacts the center can expect. The WFMS 115 then determines, using a variety of algorithms, the phone agent staffing levels by time of day that will result in the center's meeting an overall service standard goal for the forecasted number of contacts. Shift optimization algorithms are then used to calculate the shifts that will best cover the estimated staffing requirements. The WFMS 115 also provides processes to monitor phone agent productivity and to allow phone agents to select and manage their weekly workshifts. The WFMS 115 sends schedules, shift swaps, schedule adherence, and hours worked data to the HRD 120.

The HRD 120 tracks payroll information and the number of hours worked by phone agents. Specifically, the HRD 120 tracks schedules, shifts, schedule adherence, hours worked, vacation accrued, salary information, and hiring costs. The HRD 120 receives the forecast from the WFMS 115 and uses it to determine when to hire new employees and when to schedule training classes.

The CIS 125 incorporates customer account information including customer segmentation and customer value and gathers call-by-call data from the ACD 110 into a common computer database. The CIS 125 delivers account information such as customer value to the IVR 105 in order to assign an appropriate treatment for a given caller (e.g., if the customer is highly valued, route the call to the best agent).

The typical contact center computing environment 100 is not able to generate rapid analysis and plans for staffing, budgeting, call handling, and service quality goal setting. Nothing in the typical contact center environment 100 allows the management of a contact center to quickly and accurately know the effects on contact center performance of changes in staff, budgets, call handling, and service goals. The analytic techniques used in a typical contact center environment 100 are not able to perform these analyses because they are either too simplistic for these types of scenarios (e.g. Erlang C) or too slow for rapid "what-if" analysis (e.g. discrete-event simulation).

Figure 2:
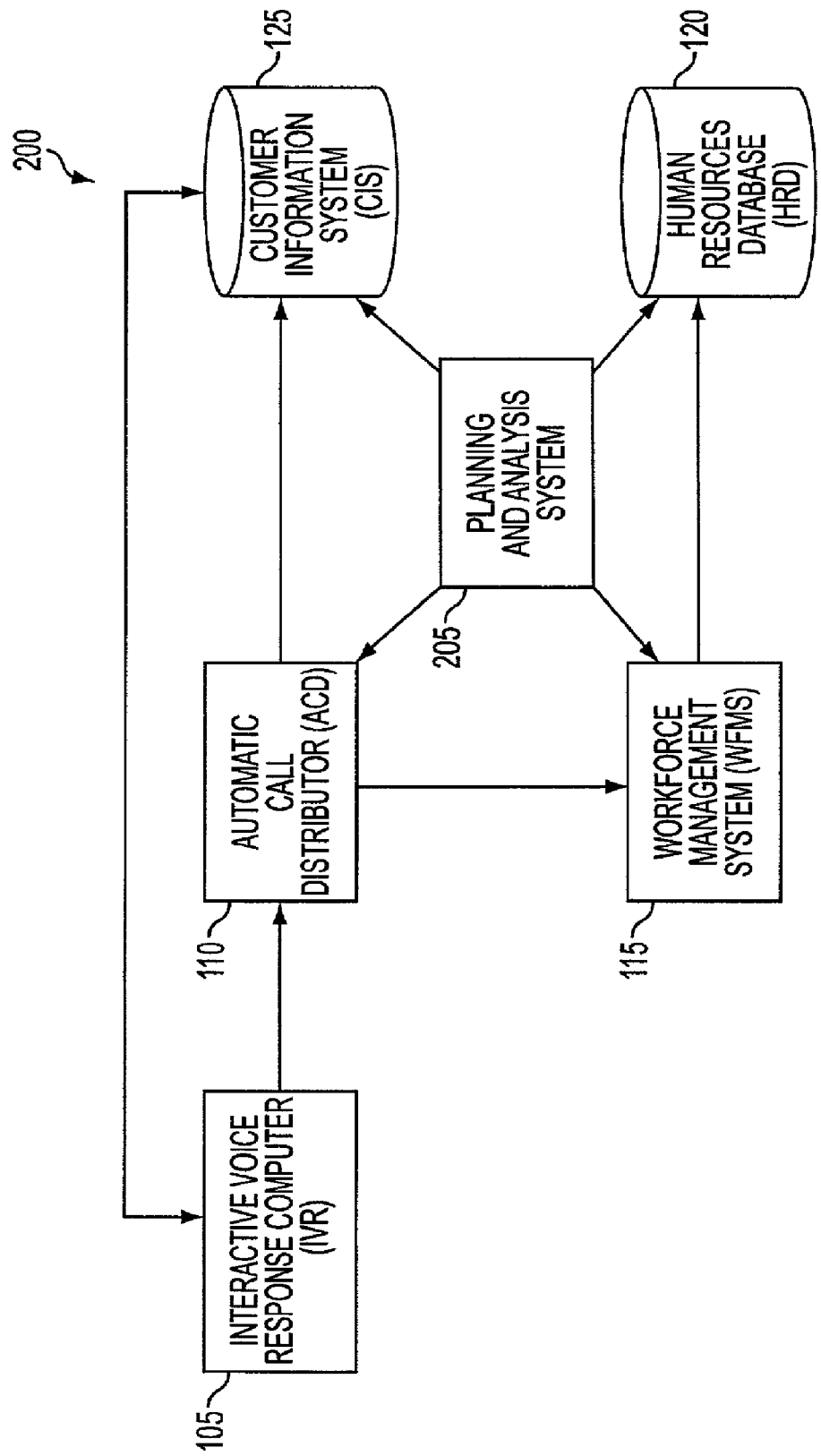
FIG. 2 shows the contact center computing environment of FIG. 1 with an additional planning and analysis system.

Referring to FIG. 2, one implementation of a processing center system is a contact center system computing environment 200 that includes the typical performance monitoring and analysis components associated with the contact center computing environment 100 with an additional interconnected planning and analysis system 205. The planning and analysis system 205 exchanges performance data and performance history data with the performance monitoring systems in the environment 100 and produces rapid analyses and plans for staffing, budgeting, call handling, and service quality goal setting. While the exemplary implementation of the processing center system is a contact center system, it should be understood that the processing center system may include any type of system in which work is handled by a workforce having a finite number of resources. Such systems may include operations that handle and process incoming email messages and inquiries, facsimile messages, insurance claims, and financial instruments including checks and coupons.

The planning and analysis system 205 receives performance information directly from all of the performance monitoring systems in the computing environment 100 with the exception of the IVR 105. Specifically, the ACD 110 provides the analysis system 205 with regular feeds of call interval data. The analysis system 205 may, alternatively, receive call interval data from the WFMS 115 rather than the ACD 110. The WFMS 115 provides the analysis system 205 with periodic feeds of the latest contact volume forecast including the call volume and handle time forecast. The WFMS 115 also may provide the analysis system 205 with a schedule adherence forecast. The HRD 120 provides the analysis system 205 with agent salary information and hiring costs that may be accessed by the system 205 as needed. Finally, the CIS 125 provides the system 205 with customer segmentation, customer value, and call-by-call data.

The planning and analysis system 205 also sends information back to all of the performance monitoring systems in the computing environment 200. Specifically, the analysis system 205 sends the call routing plan (e.g. how best to route different types of calls) back to the analysts who manage the ACD 110. The analysis system 205 provides the WFMS 115 with the staffing plan. The staffing plan includes the hiring plan; the number of vacation, sick, and training days; the number of agents transferred between management units; and the skills of the agents (e.g. able to speak Spanish or that can handle complex requests well). The WFMS 115 incorporates all of this information into the staffing schedule. The analysis system 205 also provides the staffing plan to the HRD 120 and its analysts along with a budget estimate corresponding to that staffing plan.

Finally, the analysis system 205 provides a series of customer reports to the CIS 125 and its analysts that show the experience that each customer segment has had with the contact center in the past and, given the current staffing plan, the experience each customer segment is expected to have in the future. The reports contain the following for each customer segment: the service level, the call wait time, the probability of abandon, the mean time to abandon, the cost of abandon, the average handle time, the customer value, the distribution of call purpose, and a customer satisfaction measure.

Figure 3:
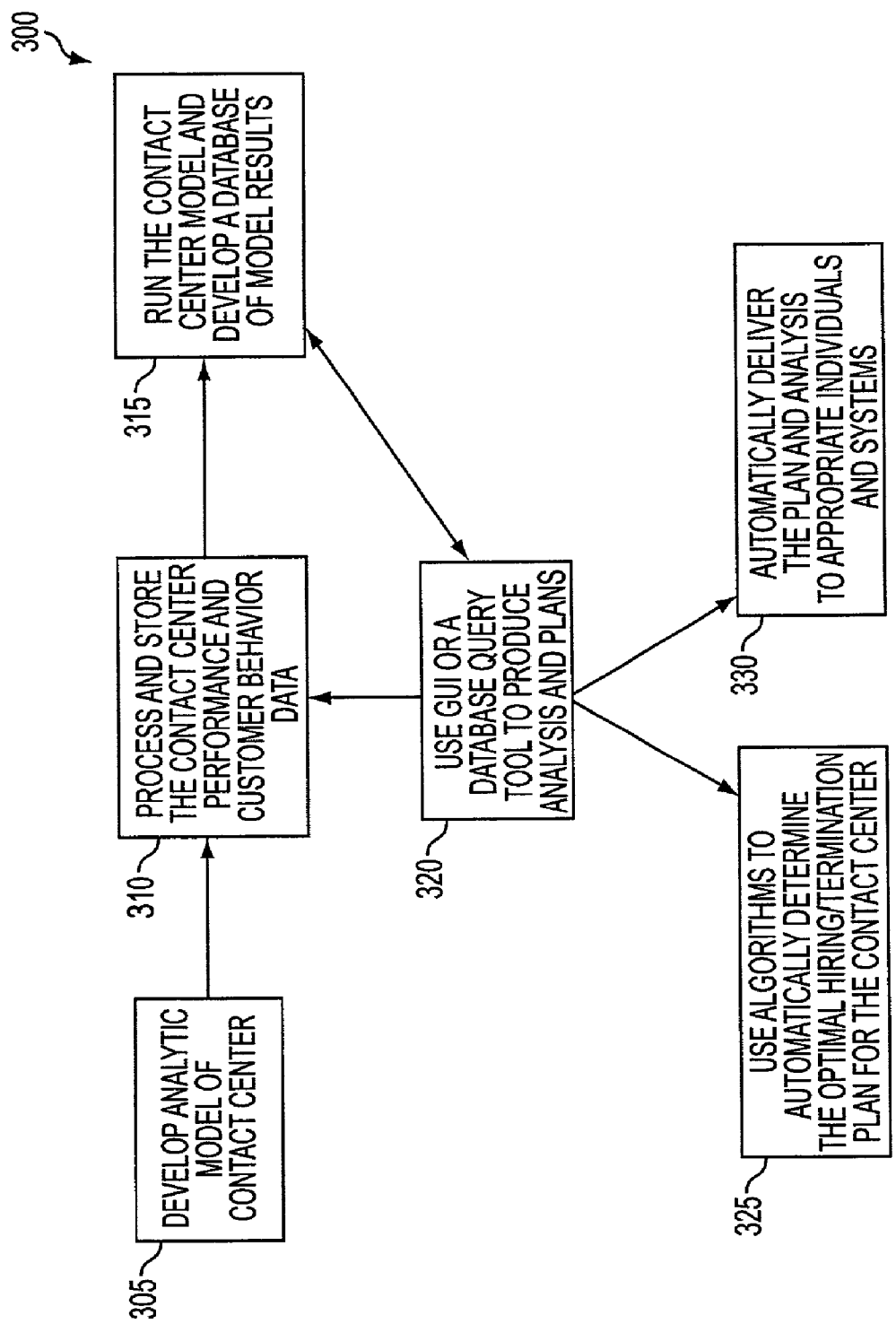
FIG. 3 shows a method to develop the planning and analysis system of FIG. 2.

Referring to FIG. 3, a method to develop a planning and analysis system 300 may include the following six steps: (1) develop an analytic model or models of the contact center 305; (2) process and store the contact center performance history information and customer behavior data 310 to build the model; (3) run the model or models and develop a database of the results 315; (4) use a graphical user interface (GUI) or a database query tool to produce both interactively and in batch mode analysis and plans 320; (5) use algorithms to automatically determine the optimal hiring/termination plan for the contact center 325; and (6) automatically deliver the plan and analysis to appropriate individuals and systems 330.

Figure 4:
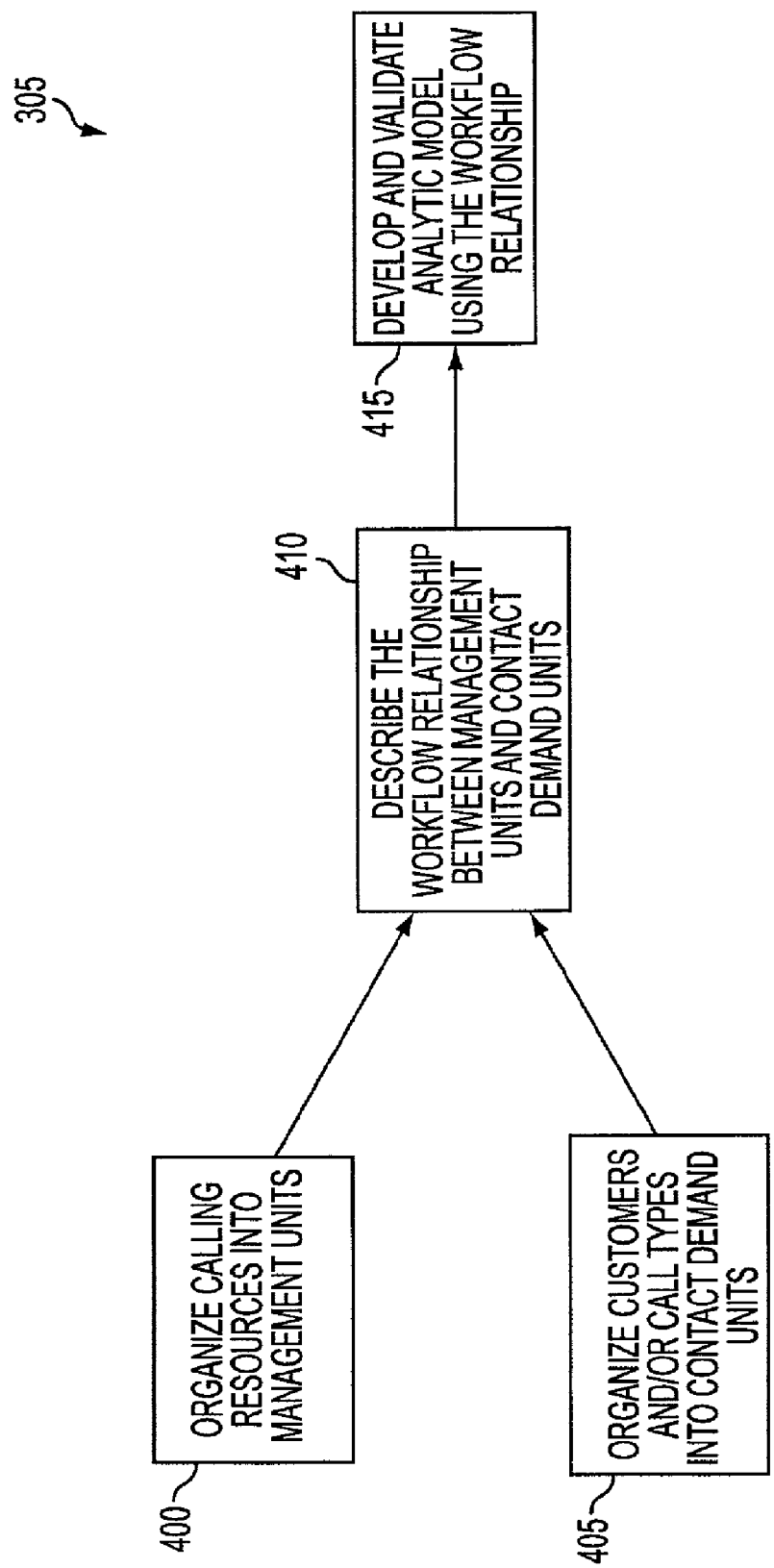
FIG. 4 shows a process of developing an analytic model of a contact center.

Referring to FIG. 4, the process of developing and building an analytic model of the processing or contact center system 305 may include four sub steps: (1) organize calling resources (e.g., phone agents, phone lines, and time allocated per call) into management units 400; (2) organize customers and/or call types into contact demand units 405; (3) describe the workflow relationship between the management units and the contact demand units 410; and (4) develop and validate an analytic model of the contact center system using the workflow relationship 415.

Organizing calling resources into management units 400 requires an understanding of how management organizes work and allocates the workforce. Management typically divides up the workforce into teams or units that manage a common function. Since the workforce associated with contact centers are frequently spread out geographically and interconnected to form a contact center system, management also may further divide up the workforce by geographic location. Thus, management units are typically a single, local, work team performing a common function (e.g. customer retention unit in location x or customer dispute resolution unit in location y).

After dividing up the workforce into management units (and potential future management units not yet in existence), a virtual representation of each management unit is developed. This virtual representation is a data structure that contains attributes such as: (1) the work hours of the unit (e.g., opens at 8 am and closes at 5:30 pm); (2) the distribution by time of available resources (e.g., what percentage of the total agents are available during each half hour increment of a given week); (3) the specialty or skill of the management unit (e.g., may be specialized by type of call handled such as a retention unit or a dispute unit); (4) the number of phone lines available in the management unit; (5) the employee schedules, including arrival and departure times, training time, and breaks; (6) the employee attrition rate (e.g., 5% employees lost every month); (7) the amount of training required for new hires and the ramp-up time for new hires (e.g., four weeks to train a new hire and then new hire is 30% as effective as an experienced agent during the first week, 80% as effective during the second week, and 100% as effective from then on); (8) the weekly attrition rate for new hires prior to their becoming 100% effective (e.g. 25%); (9) the amount of employee vacation time planned; (10) the expected employee sick time; (11) the estimated schedule non-adherence (e.g., an agent at work is actually available to receive calls for only 70% of their paid hours); (12) the new hire cost; (13) the overtime cost; and (14) the employee salary and benefit costs. This information is typically obtained from the ACD 110 or WFMS 115, the HRD 120, and interviews with management and the human resources department. The call interval data from the ACD 110 or WFMS 115 provides information related to attributes (1), (2), (5), and (11). The HRD 120 provides information related to attributes (6), (8), (9), (10), (12), (13), and (14). Interviews with management and the human resources department provide information related to attributes (1), (3), (4), (7), and (8).

Organizing customers and/or call types into contact demand units 405 requires an understanding of how management groups customer calls. Management typically divides up customer calls based on the type of servicing required, the value of the contact, the value of the customer relationship, the customer patience, and the amount of after call work or casework required. These characteristics may also be used to define contact demand units and to allocate different calls to different contact demand units. Examples of contact demand units include "VIP" or "gold" customers, Spanish speaking customers, etc.

After dividing the customer calls into contact demand units, a virtual representation of each contact demand unit is developed. This virtual representation is a data structure that contains attributes such as: (1) the contact volume (e.g., number of phone calls); (2) the contact distribution over hours, days, weeks, and months (e.g., what % of total calls occur during each half hour increment of a given week); (3) the handle time distribution (e.g., the percent of calls handled in 10 seconds or less, between 10 and 20 seconds, etc); (4) the average handle time (e.g., 2 minutes); (5) the amount of after call work or casework required; (6) the customer patience distribution (i.e., the time to abandon distribution) (e.g. the percent of calls abandoned in 10 seconds or less, between 10 and 20 seconds, etc.); (7) the mean time to abandon; (8) the contact value as determined by a financial analysis; (9) the contact callback probability (e.g. the percent chance that the contact center must call the customer back); (10) the probability of casework generated (percentage of time that the agent must do more work after call); (11) the casework handle time distribution; and (12) the average handle time for casework. The contact demand unit attributes are typically obtained from the WFMS 115, the ACD 110, the CIS 125, and interviews with management. The WFMS 115 provides information related to attribute (1). The call interval data from the ACD 110 or WFMS 115 provides information related to attribute (2). The call-by-call data stored in the CIS 125 provides information related to attributes (3), (4), (6), (7), (8), (9), (10), (11), and (12). Interviews with management provide information related to attribute (5).

Describing the workflow relationship between the management units and the contact demand units 410 requires that each contact demand unit be logically tied to one or more of the management units in such a way that the work (i.e., the contact demand unit) is assigned resources (i.e., the management unit) to accomplish the work. The workflow relationship 410 describes how calls of different contact demand units are routed among the different management units.

Call routing is of particular importance to contact center performance because of its tremendous impact on call center efficiency. Using efficient routing processes, an operation that consists of many small management units can effectively take advantage of the economies of scale that are available to larger management units while also taking advantage of the benefits of smaller, more manageable, and more specialized teams.

The workflow relationship is typically modeled through mapping arrangements between management units and contact demand units. A few examples of such mapping arrangements include: (1) management unit X answers a call from contact demand unit A directly; (2) management unit X backs up management unit Y in overflow situations; (3) management unit X handles contact demand units A, B, and C directly with A receiving priority by going to the front of the contact queue; (4) management unit X handles contact demand unit A, unless the expected service time is above a preset threshold, and other management units are below their preset threshold, then route the call to a management unit that can handle the call quickly.

Figure 5:
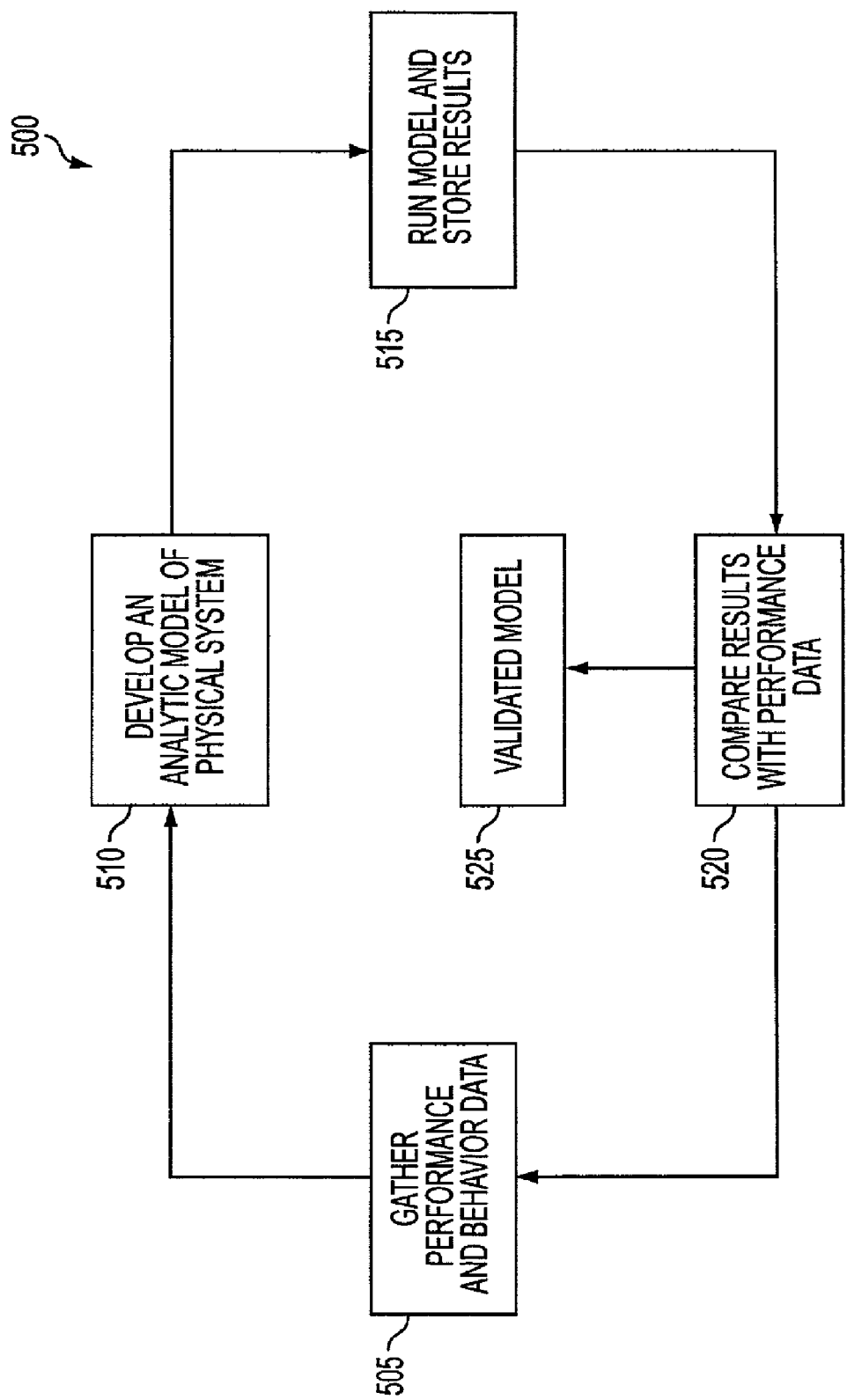
FIG. 5 shows an iterative modeling process.

The contact demand units, the management units, and the workflow relationships are then used to develop and validate an analytic model of the contact center (step 415). The analytic model may be a computer model stored in a memory or a database. FIG. 5 illustrates a generic iterative modeling process 500 that is applicable to any analytic model of a physical processing system but will, in this case, be used to develop and validate the contact center system analytic model. The generic modeling process 500 includes gathering performance and behavior data (step 505), developing an analytic model of the physical processing system based on the performance and behavior data (step 510); running the model and storing the results (step 515) which may include predictions of the expected performance of the contact center system; comparing the results with actual performance data (step 520); and validating the model (step 525).

Figure 6:
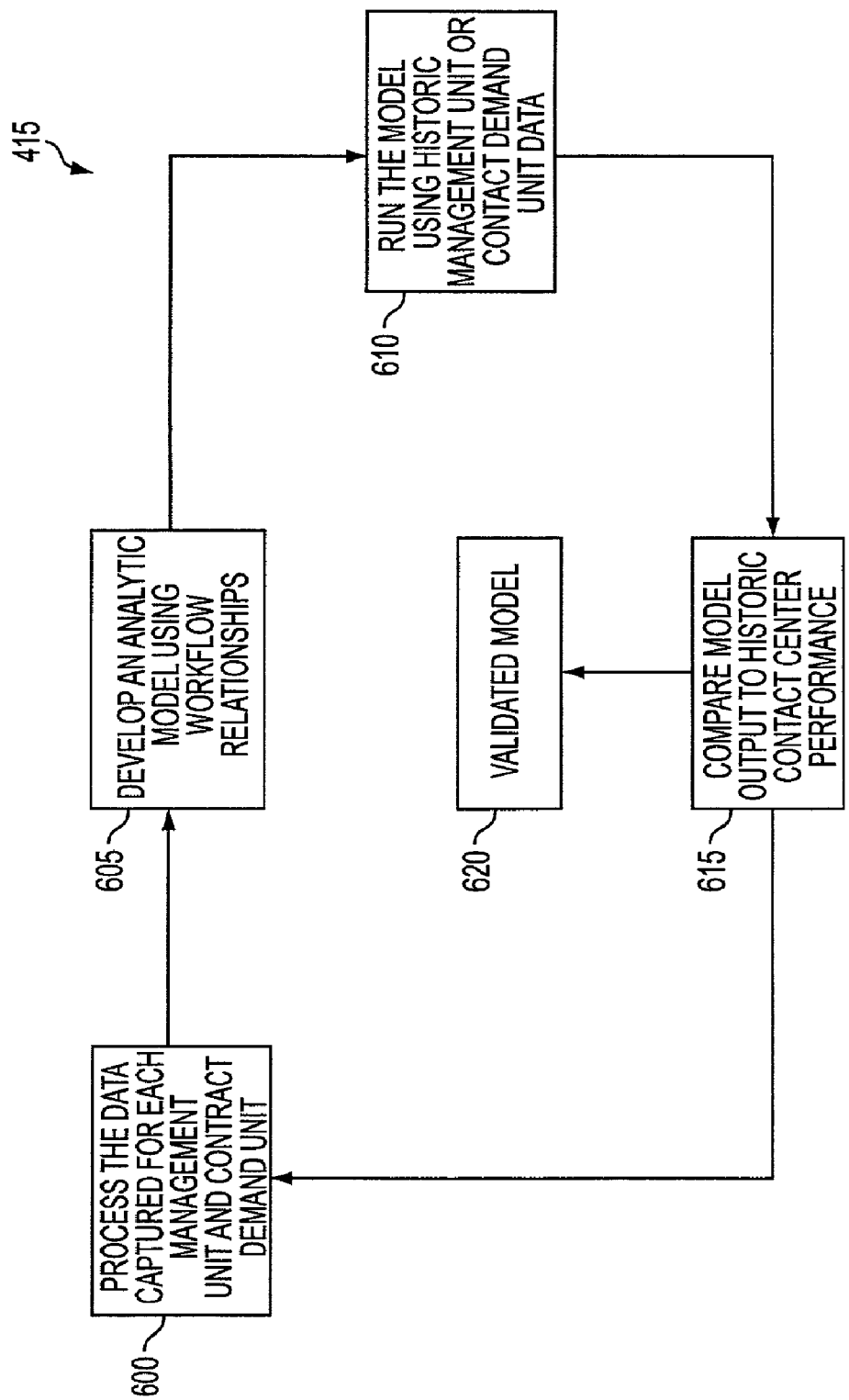
FIG. 6 shows the modeling process of FIG. 5 applied to a contact center.

The generic iterative modeling process 500 may be used to develop and validate the contact center model as shown in FIG. 6. Developing and validating the contact center model (step 415) includes processing the data captured for each management unit and contact demand unit (step 600), developing an analytic model using the workflow relationships (step 605), running the model by inputting historic management unit and contact demand unit data (step 610), and comparing the model output with historic contact center performance figures (step 615). If the model output corresponds to the historic contact center performance figures, then the model is validated (step 620). If the model output does not correspond to the historic contact center performance figures, then the assumptions used to develop the model must be revisited and the data captured for each management unit and contact demand unit must be reprocessed.

Processing the data captured for each management unit and contact demand unit (step 600) requires obtaining and processing contact center performance information from the ACD 110, the CIS 125, and interviews with management. The ACD 110 generates daily call interval reports that can be allocated to different management units and contact demand units using the workflow relationships developed in step 410. The ACD 110 also generates call-by-call data that is stored by the CIS 125 in a database. This call-by-call data may also be allocated to different management units and contact demand units using the workflow relationships developed in step 410. The CIS 125 also stores an estimate of the call-back probability with respect to each customer group and call type. This call-back probability may similarly be allocated to each contact demand unit. Interviews with management disclose the number of phone lines and workstations available in each management unit.

The daily call interval reports produced by the ACD 110 include quarter hour, half hour, or hourly summaries of contact center performance. These performance summaries include the following: (1) call volume; (2) the number of phone agents available; (3) the number of phone agents occupied by answering calls (occupancy); (4) the average handle time; (5) the number of abandons; (6) the mean time to abandon; (7) the average wait time; (8) the service level achieved; and (9) the average call duration.

The call-by-call data obtained from the CIS 125 include: (1) the time of call arrival as determined by the IVR 105; (2) the options selected by the caller in the IVR 105; (3) the account number (if applicable) provided by the IVR 105; (4) the wait time of the call; (5) the employee that handled the call; (6) the handle time of the call; (7) the time to abandon (if applicable); (8) the amount of after call or casework required; and (8) the value per call and probability of sale (if applicable).

The daily call interval reports produced by the ACD 110 and the call-by-call data obtained from the CIS 125 are processed into intra-day, intra-week, or intra-month management unit and contact demand unit performance distribution data. This is accomplished by gathering the data over many weeks, using the workflow relationship developed in step 410 to allocate the data to management units and contact demand units, and performing calculations to create an average or moving average the intra-day, intra-week, intra-month, and inter-month patterns of performance for each management unit and contact demand unit.

These calculations require that some assumptions be made regarding how to best determine the proper distribution from the reported data. For example, the best distribution may be obtained by using curve-fitting rather than by using the actual historic data. Alternatively or in addition, the best distribution may be obtained by using a moving average in which different weighting is assigned to earlier time periods and to later time periods. These assumptions may be revisited and changed in the course of developing and validating the contact center model in step 415.

The resulting management unit performance distribution data is the intra-day, intra-week, intra-month, inter-month staff availability distribution. The resulting contact demand unit performance distribution data include: (1) the intra-day, intra-week, intra-month, inter-month call volume distribution; (2) the intra-day, intra-week, intra-month, inter-month mean handle time distribution; (3) the intra-day, intra-week, intra-month, inter-month value per call distribution; (4) the handle time distribution; (5) the intra-day, intra-week, intra-month, inter-month mean customer patience (i.e., time to abandon); (6) the customer patience distribution; (7) the distribution of value per call; (8) the intra-day, intra-week, intra-month, inter-month mean after call or case work distribution; and (9) the distribution of after call or casework.

All of the distribution data is expressed in percentages of either a total number, an average number, or a maximum number over a given time period. For example, intra-week call volume distribution data expressed using an hourly time interval may be 2% of the week's total call volume on Monday from 9-10 am, 1% on Monday 10-11 am, and 5% on Monday 11-12 pm. Intra-week staff availability distribution data expressed using an hourly time interval may be 70% of total agents available that week on Monday 9-10 am, 80% on Monday 10-11 am, 60% on Monday 11-12 pm, etc. Intra-week value per call distribution data expressed using an hourly time interval may be 80% of mean value per call for that week on Monday 9-10 am, 70% on Monday 10-11 am, etc. Intra-week handle time mean distribution data expressed using an hourly time interval may be 110% of the week's mean handle time for calls received on Monday 9-10 am, 80% of the mean handle time for calls received Monday 10-11 am, etc.

The management unit and contact demand unit performance distribution data may be multiplied by a scale factor to get an estimate of the actual performance distribution during the corresponding time interval. The scale factor may be, for example, a historic staffing level (i.e., total phone agents), total call volume, mean handle time, mean value per call, mean customer patience, and mean after call work or casework. The result is an estimate of the historic management unit and contact demand unit performance during that interval.

The analytic model of the contact center developed in step 605 is able to evaluate scenarios that are more comprehensive and accurate than those based on industry standard Erlang equations. Such a model may be developed using many methods, the most comprehensive of which is the discrete-event simulation method. The following discussion assumes that the discrete-event simulation method is used to generate the model. The same steps, however, may be carried out using other appropriate techniques, including Monte Carlo simulation and modified or algorithmic Erlang equations.

The discrete-event simulation model of the contact center accepts the following inputs: (1) the performance distribution data for each contact demand unit as processed in step 600; (2) scale factors for the distribution data for each contact demand unit (i.e. total call volume, mean handle time, mean value per call, etc.); (3) the staffing level distribution data for each management unit as processed in step 600; (4) a scale factor for the staffing level distribution data for each management unit (i.e. a staffing level); (5) the number of phone lines available in each management unit as determined in step 600 from interviews with management; (6) the number of workstations available in each management unit as determined in step 600 from interviews with management; and (7) the workflow relationships between contact demand units and management units developed in step 415. If modeling multiple contact centers, each contact center and customer group must be broken down into its constituent management units and constituent contact demand units, respectively, prior to being inputted into the model.

A person skilled in the art is able to take these inputs and create a discrete-event simulation model of the contact center(s) or contact center system that can generate the following outputs: (1) expected service level; (2) average wait time (i.e., average speed of answer); (3) distribution of the wait time; (4) expected distribution of customer satisfaction; (5) revenue; (6) profit; (7) number of abandons; (8) number of blocked calls; (9) utilization of phone lines; (10) utilization of phone agents; (11) cost per call per hour; (12) cost per sale; and (13) any other measure of interest to call center management. These outputs may be obtained at the management unit level or rolled up to the contact center level.

In order to validate the model, the model is run using historic management unit and contact demand unit data (step 610), and the output of the model is compared to the corresponding historic performance of the contact center (step 615). Historic scale factors are applied to the contact demand unit distribution data, and historic staffing levels are applied to the management unit staff availability distribution data. The output of the model should correspond to the actual historic contact center performance. If the output does correspond to the actual historic performance of the contact center, the model is validated (step 620). However, if the output of the model does not correspond to the actual historic performance, then the inputs to the model and/or the assumptions used to develop the workflow relationship, the performance distributions of each contact demand unit, and the staffing level distribution of each management unit must be revisited. Changing any of the assumptions requires reprocessing the historic data as necessary in step 600. The model is then modified accordingly in step 605, and the modified model is run with the historic scale factors and new inputs in step 610. The output is then compared to the historic performance of the contact center (step 615), and the cycle begins again as necessary until the model is validated (step 620).

Figure 7:
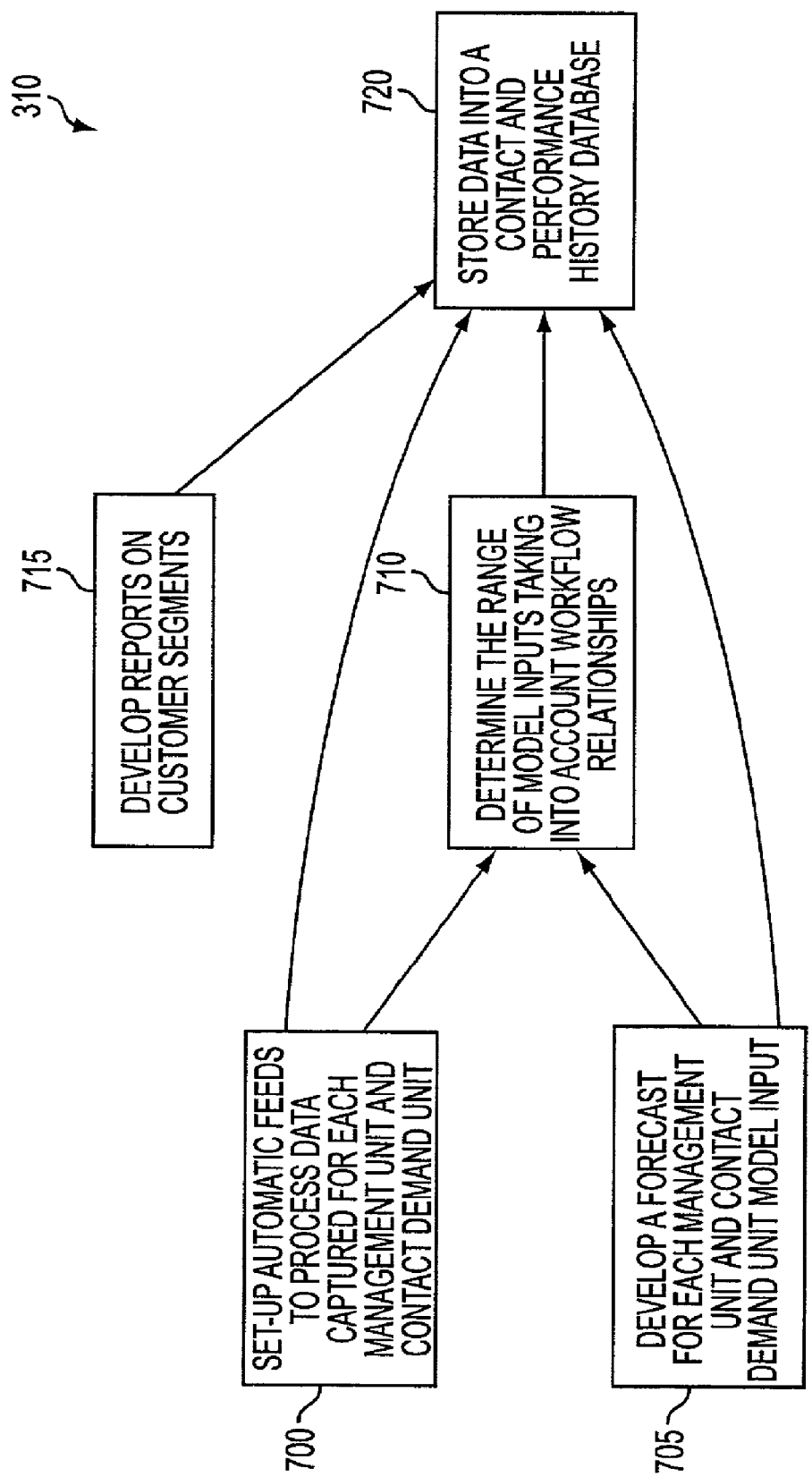
FIG. 7 shows a method to process and store contact center performance and customer behavior data.

Once the analytic model of the contact center is completed (step 305), the next step in building the planning and analysis system (process 300) is to process and store the contact center performance and customer behavior data (step 310). Referring to FIG. 7, processing and storing the contact center performance and customer behavior data (step 310) includes setting up automatic feeds to process the data captured by the ACD and stored in the CIS for each management unit and contact demand unit (step 700), developing a forecast for each management unit and contact demand unit model input (step 705), determining the range of contact center model inputs taking into account workflow relationships (step 710), developing reports on customer segments (step 715), and storing all of this data into a contact and performance history database (step 720).

Setting up automatic feeds to process the data captured by the ACD and CIS (step 700) is necessary to ensure that the planning and analysis system 205 uses the most current and accurate data in its calculations. Before these feeds are set up, the historic contact center performance distribution data for each contact demand unit and management unit must be obtained from historic ACD call interval reports and historic CIS call-by-call data. This may be accomplished by using the method disclosed in step 600. This data is then stored in a contact and performance history database (step 720).

At regular intervals, the ACD generates new call interval reports and sends to the CIS new call-by-call data. These new reports and the new call-by-call data are automatically fed into the planning and analysis system 205 at regular intervals. Using the workflow relationships developed in step 415, the new call interval report data and the new call-by-call data are allocated among the contact demand units and the management units and are then processed with the historical distribution data in order to produce updated distribution data. This is accomplished by simply updating the calculations to average, or moving average the intra-day, intra-week, intra-month, and inter-month patterns of performance for each management unit and contact demand unit. The updated distributions are then stored in the contact and performance history database (step 720).

Developing a forecast for each management unit and contact demand unit model input (step 705) involves both developing forecasts using standard forecasting techniques known to one skilled in the art and/or processing the forecasts available from the WFMS. Specifically, the call volume and handle time forecasts for each contact demand unit may be periodically obtained by setting up a periodic feed of call volume and handle time forecasts from the WFMS and allocating the forecasts among the different contact demand units. Forecasts of staffing level, customer patience, mean after call work or casework, and value per call are obtained by using standard forecasting techniques on current and historical performance data captured for each applicable management unit and contact demand unit. The forecasts of the model inputs are used as scale factors for the distributions calculated in step 700 and are ultimately inputted into the model developed in step 305 in order to obtain management unit and contact center performance forecasts.

Determining the range of contact center model inputs taking into account workflow relationships (step 710) is necessary in order to limit the size of the granular contact center performance database that will ultimately be used to store the contact center forecast information for all feasible model inputs in step 805.

The contact center model developed in step 305 to predict contact center and management unit performance in response to different contact demand units may be thought of as being composed of multiple smaller models of individual workflow relationships. In other words, each individual workflow relationship is represented by a smaller model, and each smaller model processes data simultaneously and in parallel with the other smaller models representing the other workflow relationships in the contact center. Determining the feasible range of model inputs, therefore, requires that the range of model inputs for each individual workflow relationship model be obtained.

Determining the range of model inputs for each individual workflow relationship model requires estimating the maximum and minimum possible forecasted call volumes, number of phone lines, staffing levels, customer patience, and handle times inputted into each individual workflow relationship model. These maximum and minimum values are estimated over a small time increment in order to obtain significant granularity in the performance outputs of the model developed in step 305. For purposes of the following discussion, this small time increment will be assumed to be one hour. This step limits the range of the five most important scale factor inputs to each of the workflow relationship models of the model developed in step 305 and thereby bounds the size of the granular contact center performance database that stores the model outputs as discussed below with respect to step 315.

Estimating the maximum and minimum possible hourly call volumes for a given workflow relationship requires estimating the maximum and minimum hourly call volumes for each individual contact demand unit that is included in the workflow relationship. The maximum and minimum hourly call volumes for each contact demand unit is obtained by estimating a reasonable maximum and minimum monthly call volume forecast for the contact center and then allocating the forecasted monthly call volume to the different contact demand units that are serviced by the contact center. The forecasts of call volumes developed in step 705 may be used to determine this estimate.

The maximum and minimum hourly call volumes for each contact demand unit are then obtained by applying the maximum and minimum monthly call volumes allocated to that contact demand unit to that contact demand unit's distribution of weekly, daily, and hourly call volumes as estimated in step 700. The upper and lower bound of the potential swings in the resulting hourly call volumes for each contact demand unit is the maximum and minimum hourly call volume for that contact demand unit. The maximum and minimum hourly call volumes may then be used to determine the maximum and minimum hourly call volume inputs to the workflow relationship model. For example, if the workflow relationship is "management units x and y handle contact demand units A, B, and C directly" and the maximum and minimum hourly call volumes for contact demand units A, B, and C are 100-5 calls, 50-10 calls, and 20-5 calls, respectively, then the maximum and minimum hourly call volume inputted into the workflow relationship model is 170-20.

Estimating the maximum and minimum number of phone lines for a given workflow relationship requires estimating the maximum and minimum number of phone lines for each individual management unit that is included in the workflow relationship. The maximum and minimum number of phone lines for each management unit is obtained from interviews with management. The maximum number of phone lines for a given workflow relationship may then be calculated by adding up the maximum number of phone lines for each management unit involved in the workflow relationship. Similarly, the minimum number of phone lines for a given workflow relationship may be calculated by adding up the minimum number of phone lines for each management unit involved in the workflow relationship.

Estimating the maximum and minimum hourly staffing level for a given workflow relationship requires estimating the maximum and minimum hourly staffing level for each individual management unit included in the workflow relationship. This maximum and minimum hourly staffing level for each management unit is obtained by estimating the reasonable maximum and minimum monthly staffing level forecast for the contact center and then allocating the forecasted staffing level to the different management units of the contact center. The forecasts of staffing levels developed in step 705 may be used to determine this estimate. The maximum and minimum hourly staffing levels for each management unit are then obtained by applying the maximum and minimum monthly staffing levels allocated to that management unit to that management unit's distribution of weekly, daily, and hourly call volumes as estimated in step 700. The upper and lower bounds of the reasonable swings in the resulting staffing levels for each management unit is the maximum and minimum hourly staffing level for that management unit. The maximum and minimum hourly staffing levels may then be used to determine the maximum and minimum hourly staffing level inputs to the workflow relationship model. For example, if the workflow relationship is "management unit x and y handle contact demand units A, B, and C directly" and the maximum and minimum hourly staffing levels for management units x and y are 50-5 phone agents and 90-10 phone agents, then the maximum and minimum hourly staffing level inputted into the workflow relationship model is 140-15.

The maximum staffing level must also be bounded by the number of physical resources available or potentially available in the contact center (i.e., work space and workstations). This information is obtained in interviews with the contact center management.

Estimating the maximum and minimum hourly customer patience for a given workflow relationship requires estimating the maximum and minimum hourly customer patience for each individual contact demand unit that is included in the workflow relationship. The maximum and minimum hourly customer patience for each individual contact demand unit may be obtained using the exact same approach as discussed above with respect to call volumes. The maximum customer patience inputted into the workflow relationship model is conservatively estimated as the greatest value of the maximum customer patience estimates for the different contact demand units included in the workflow relationship. Similarly, the minimum customer patience inputted into the workflow relationship model is conservatively estimated as the lowest value of the minimum customer patience estimates for the different contact demand units. For example, if the workflow relationship is "management units x and y handle contact demand units A, B, and C directly" and the maximum and minimum customer patience for contact demand units A, B, and C are 180-60 seconds, 200-40 seconds, and 210-70 seconds, respectively, then the maximum and minimum customer patience inputted into the workflow relationship model is 210-40 seconds.

The maximum and minimum hourly mean handle time for a given workflow relationship may be obtained using the exact same approach as discussed above with respect to customer patience.

Developing reports on customer segments (step 715) includes processing that allows the planning and analysis system 205 to describe more accurately the bounds and dispersion of the experience of a given customer segment when interacting with the contact center. This allows managers to access information and generate reports that provide them with a better understanding of how contact center performance is distributed among different customer segments.

The processing step 715 begins by accessing the call-by-call data from the CIS 125. This call-by-call data is then aggregated and segmented by account characteristics, by wait time, or by time of day called. After the aggregation and segmentation, summary statistics are produced for each customer segment. The summary statistics produced for each segment may include: (1) service level; (2) call wait time; (3) probability of abandon; (4) mean time to abandon; (5) the cost of abandon; (6) average handle time; (7) customer value; and (8) the distribution of call purpose. Another statistic that may be produced is average customer "satisfaction." The satisfaction of a customer may be estimated by testing and surveying the customer base. The summary statistics are then incorporated into a report that describes the customer behavior of a given customer segment. The report may be used by managers to obtain a better understanding of how contact center performance impacts different customer segments.

The data produced in steps 700, 705, 710, and 715 is then stored in a contact and performance history database (step 720). The data stored includes: management unit and contact demand unit performance distribution data (step 700); staffing levels for each management unit (step 705); call volume, handle time, value per call, customer patience, and mean after call work or casework for each contact demand unit (step 705); the range of call volumes, number of phone lines, staffing level, customer patience, and handle times for each workflow relationship (step 710); and summary statistics of different customer segments (step 715). Contact center performance and customer behavior data may also be stored within the contact and performance history database in order to calibrate models, produce ad-hoc analysis and produce model validation reports.

Once the contact center performance and customer behavior data has been processed (step 310), the next step in building the planning and analysis system (method 300) is to run the contact center model and develop a database of the predictions and results (step 315).

Figure 8:
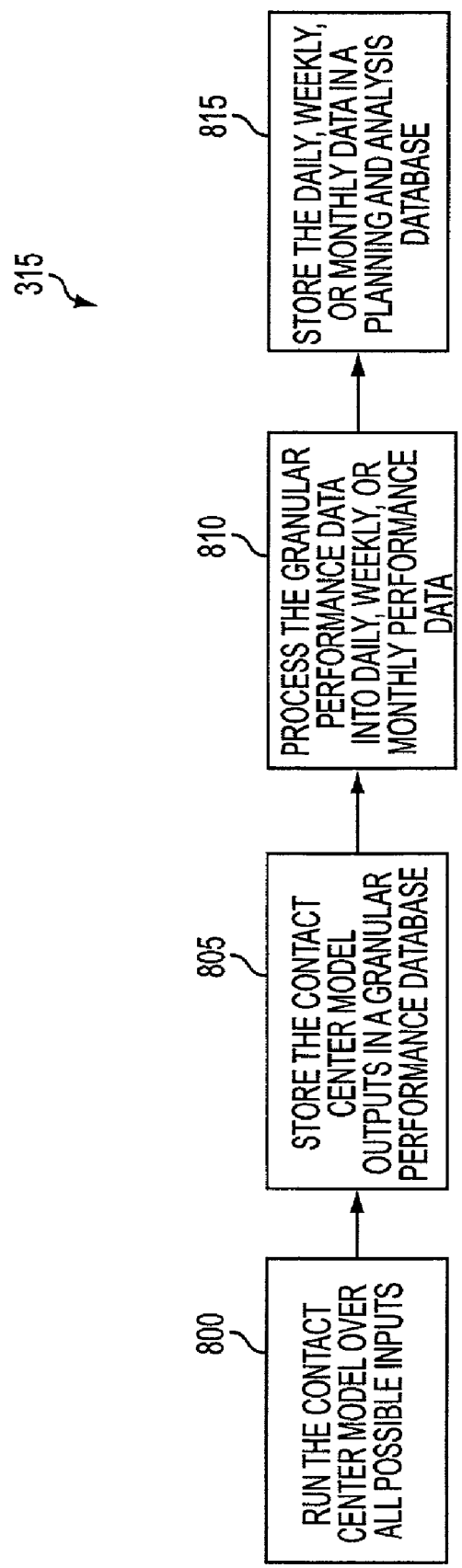
FIG. 8 shows a method to use the model of a contact center model to develop a database of predictions for a set of scenarios.

Referring to FIG. 8, running the contact center model and developing a database of the results (step 315) includes running the contact center model over all possible inputs (step 800), storing the contact center model outputs in a granular performance database (step 805), processing the granular performance data into daily, weekly, or monthly performance data (step 810) and storing the daily, weekly, or monthly performance data in a performance and analysis database (step 815).

Running the contact center model over all possible inputs (step 800) requires inputting the range of inputs determined in step 710 into each workflow relationship model of the analytic model developed in step 305. The following algorithm is used to generate all possible performance outputs for each workflow relationship model:

```
For all staff between MinStaff and MaxStaff
    For all call volumes between MinCallVolume and MaxCallVolume
        For a patience between MinPatience and MaxPatience
            For all handle times between MinAveHT and MaxAveHT
                For all phone lines between MinLines and MaxLines
                    Run workflow relationship model and store output
                End Loop
            End Loop
        End Loop
    End Loop
End Loop
```

Storing the contact center model outputs in a granular performance database (step 805) requires running the algorithm above using data corresponding to a fixed and small interval of time and storing the outputs of the model. Assuming the unit of time is hourly, the inputs to the model used in the algorithm are hourly increments of staffing, call volume, customer patience, handle time, and phone lines. The corresponding outputs of the model are predictions and/or forecasts of hourly contact center performance metrics. The performance metrics may include: (1) expected service level; (2) average speed of answer; (3) distribution speed of answer; (4) expected distribution of customer satisfaction; (5) revenue; (6) profit; (7) number of abandons; (8) number of blocked calls; (9) utilization of phone lines; (10) utilization of phone agents; (11) cost per call per hour; and (12) cost per sale. Forecasts of contact center and management unit performance in response to a given contact demand unit is ultimately determined by rolling up the forecasted performance predicted by each workflow relationship model.

The granular contact center performance data is then processed into daily, weekly, or monthly performance data (step 810). Assuming an hour is the time increment, the granular performance data is processed into daily, weekly, or monthly performance data by applying the hourly staff distribution, call volume distribution, customer patience distribution, handle time distribution, and phone line distribution developed in step 700 to a given daily, weekly, or monthly staffing level, call volume, customer patience, handle time, and number of phone lines, respectively. The hourly contact center performance outputs of the model are then rolled up into daily, weekly, or monthly contact center performance figures through addition (e.g. number of blocked calls, number of abandoned calls, etc.), volume weighted average (e.g. service level), or whatever algebraic operation is appropriate. The daily, weekly, or monthly contact center performance figures are then stored in a planning and analysis database (step 815).

Once the planning and analysis database is developed in step 815, a user may employ a graphical user interface or a database query tool to access and analyze the contact center performance results, which may include predictions, that are stored in the planning and analysis database to create performance scenarios (step 320). The user inputs a set of scale factors for staffing level, total call volume, mean handle time, mean value per call, mean customer patience, and mean after call or casework and is then able to see the resulting contact center or management unit performance. Based on this information, the planning and analysis system 205 is able to create performance scenarios that can be further analyzed by the user to assist in making management decision relating to the operation of the contact center. Additional sets of scale factors can be used to generate additional performance scenarios. As an additional function, the planning and analysis system 205 may further process the scale factors and the predictions to predict process performance metrics of the contact center and use the process performance metrics to generate appropriate employee schedules. Since the planning and analysis database has already produced daily, weekly, and monthly performance results for all possible scale factor inputs, the model developed in step 315 does not need to be rerun and the user simply accesses the planning and analysis database to obtain the performance results of the model for that given set of scale factor inputs.

Figure 9:
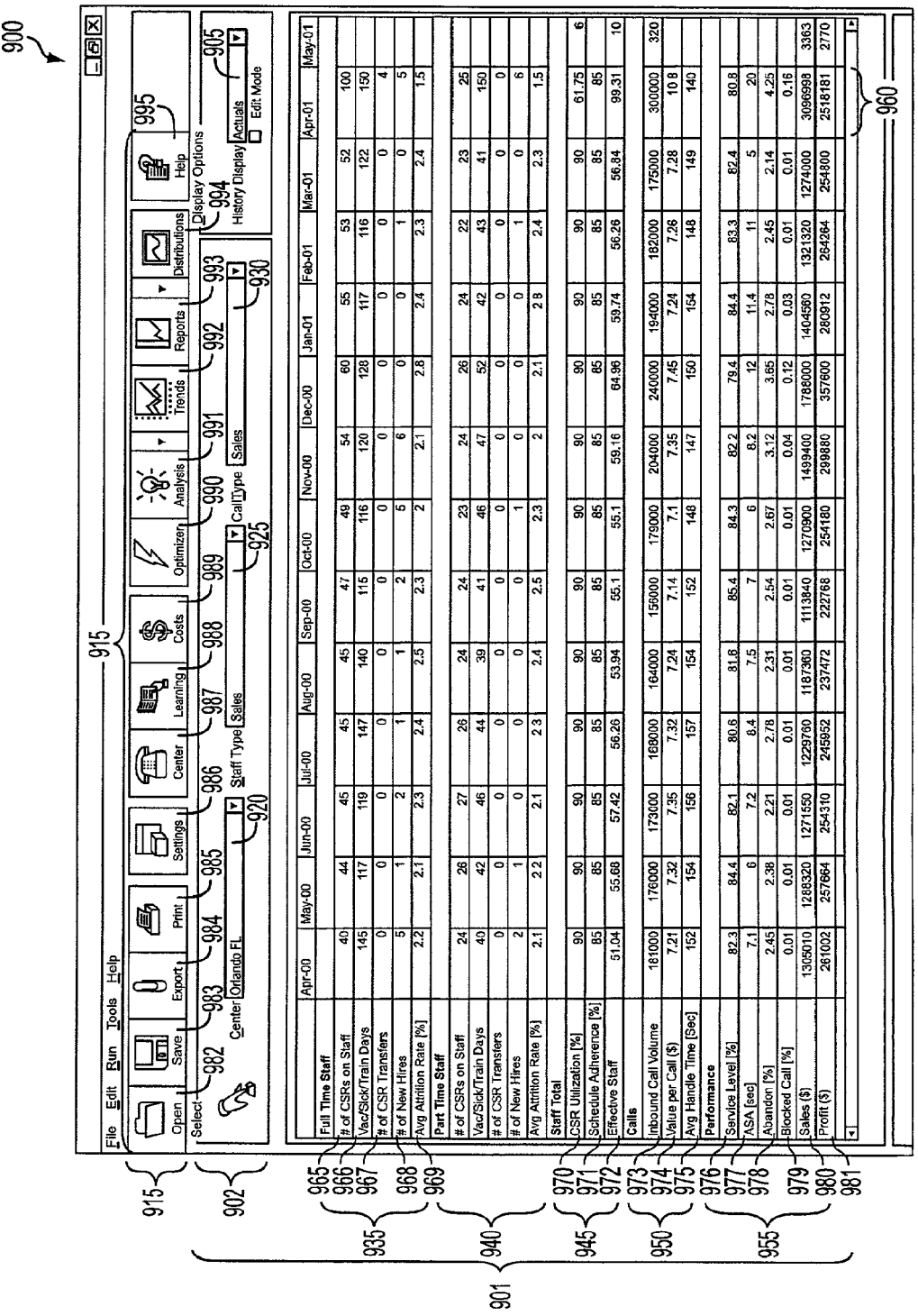
FIG. 9 shows a graphical user interface for the planning and analysis system of FIG. 2.

Referring to FIG. 9, one implementation of a graphical user interface 900 for the planning and analysis system 205 includes a set of selection fields 902, a display options field 905, a set of analysis fields 910, and a toolbar of options 915.

The set of selection fields 900 include a contact center field 920, a staff-type field 925, and a call type field 930. These fields allow the user to select for analysis a particular management unit of a given contact center (within the contact center system) when responding to a specific contact demand unit. The user sets the contact center by typing in the designation of the contact center in the field 920 or by selecting the contact center designation from a drop-down menu. The contact center may be, for example, designated by its geographic location or by its function. Similarly, the user may select a management unit by typing in the designation of the management unit in the staff type field 925 or by selecting the management unit designation from a drop-down menu. Management units may be, for example, designated by their function. Finally, the user may select a contact demand unit by typing in the designation of the contact demand unit in the call type field 930 or by selecting the contact demand unit designation from a drop-down menu. Contact demand units may be, for example, designated by the function of the call or the type of customer making the call. In FIG. 9, the user has decided to analyze the performance of the management unit "sales" in the "Orlando Fla." contact center when responding to the contact demand unit "sales."

The analysis fields 910 include full-time staff fields 935, part time staff fields 940, staff total fields 945, calls fields 950, and performance fields 955. In FIG. 9, all of these fields show values per month. In this case, the current month under analysis (column 960) is April 2001. The values of the analysis fields 910 corresponding to the months of April 2000 to March 2001 are also shown and display the historic staffing level, call volume, and performance values if the display options field 905 is set to "Actual". However, if the display options field 905 is set to "Forecasts," then the staffing level, call volume, and performance values shown in the analysis fields 910 reflect the historic forecasts for those fields. Alternatively, the analysis fields 910 may be chosen to correspond to values per day or per week by, for example, double-clicking one of the month labels at the top of one of the columns (e.g., double-clicking on the words "Mar-01").

The full time staff fields 935 are fields that contain values for the following: the number of customer service representatives (CSR) (i.e., phone agents) on staff (field 965), the aggregate number of vacation/sick/training days for the staff (field 966), the number of CSRs transferred to the management unit from another management unit (field 967), the number of new hires in the management unit (field 968), and the average attrition rate of the phone agents in the management unit (field 969). The part time staff fields 940 are the same as the full time staff fields 935 but correspond to CSRs that only work part time.

The staff total fields 945 include a CSR utilization field 970, a schedule adherence field 971, and an effective staff field 972. The CSR utilization field is an output of the planning and analysis system 215 and corresponds to the percentage of time that a phone agent (i.e., a CSR) is actually servicing calls rather than waiting for calls. For example, if the utilization is 90%, then a phone agent is spending 90% of his or her time servicing calls and 10% waiting for calls. The schedule adherence field 970 is an estimate of the percentage of the total scheduled phone agent work hours that is actually spent not either servicing calls or waiting for calls. In other words, the actual time that a phone agent spends servicing calls or waiting for calls is less than the total time that the phone agent spends at work because of the time spent on work breaks, going to the bathroom, and on other activities at work not related to servicing calls or waiting for calls. The schedule adherence information is provided by the WFMS.

The values in the full time staff fields 935, the part time staff fields 940, and the schedule adherence field 971 may be used to determine the effective staff value (field 972). The effective staff value is the monthly staffing level scale factor for the selected management unit. This scale factor is one of the set of scale factors used when looking up the performance of the management unit stored in the planning and analysis database.

Figure 10:
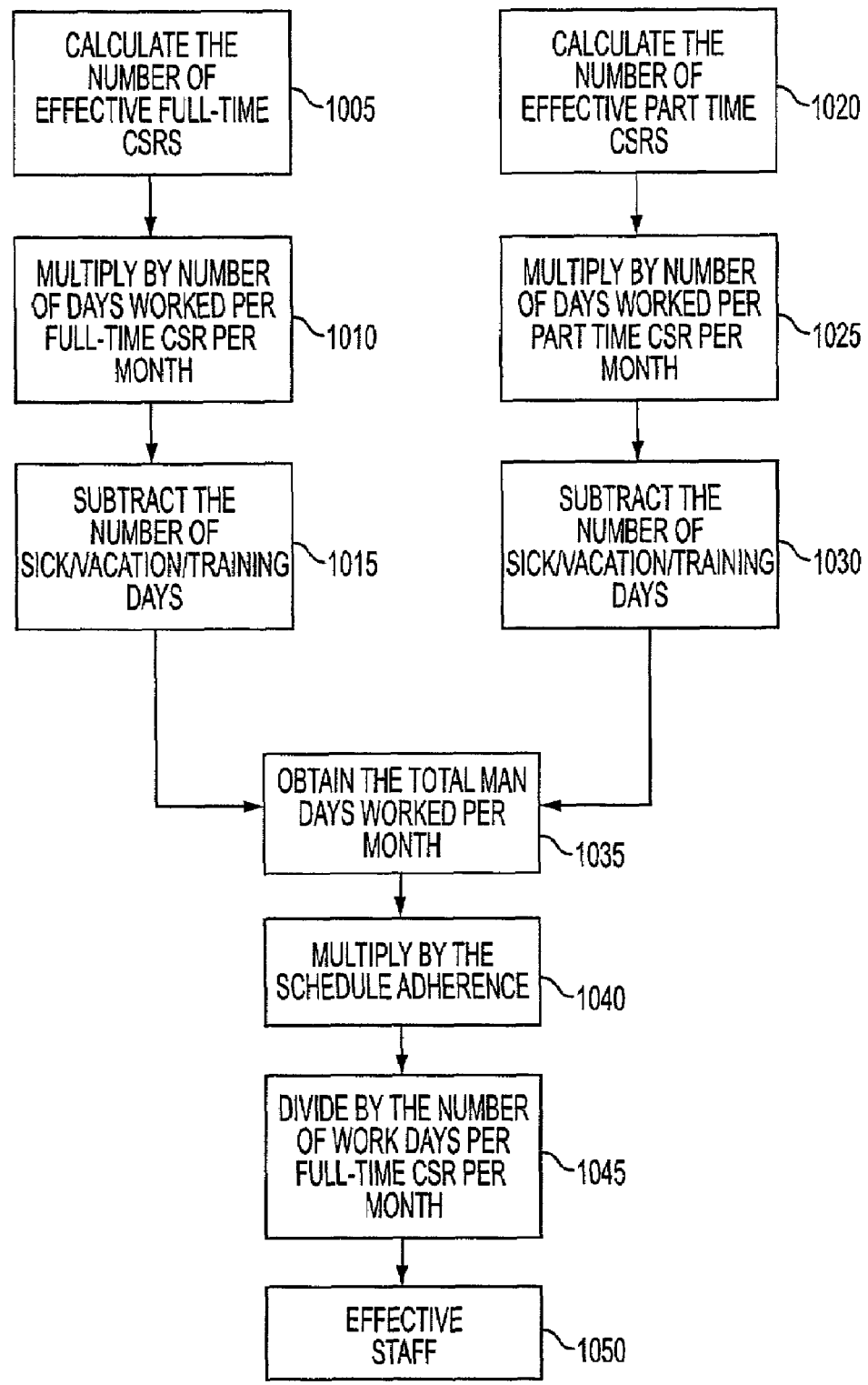
FIG. 10 shows a process used to calculate the effective staff for a contact center.

The process used to obtain the effective staff (i.e., monthly staffing level scale factor for the management unit) is illustrated in FIG. 10. First, the number of effective full time CSRs is calculated (step 1005). The number of effective full time CSRs must take into account the current full time staff in the management unit, the number of full time CSRs transferred into the management unit, and the number of full time new hires. An effective number of CSRs for the current staff and the transfers is determined by adding the number of full time CSRs on staff (field 965) to the number of full time CSR transfers (field 967) and then applying the average full time CSR attrition rate (field 969) to this number. The attrition rate may be applied in a distributed manner over the month or by simply approximating the attrition as an initial decrease in the monthly number of CSRs. For example, assuming 100 CSRs on staff, 4 CSR transfers, and a 1.5% attrition rate, the effective number of CSRs for the current staff and the transfers for the month is (100+4)*(1−0.015)=102.4.

Figure 11:
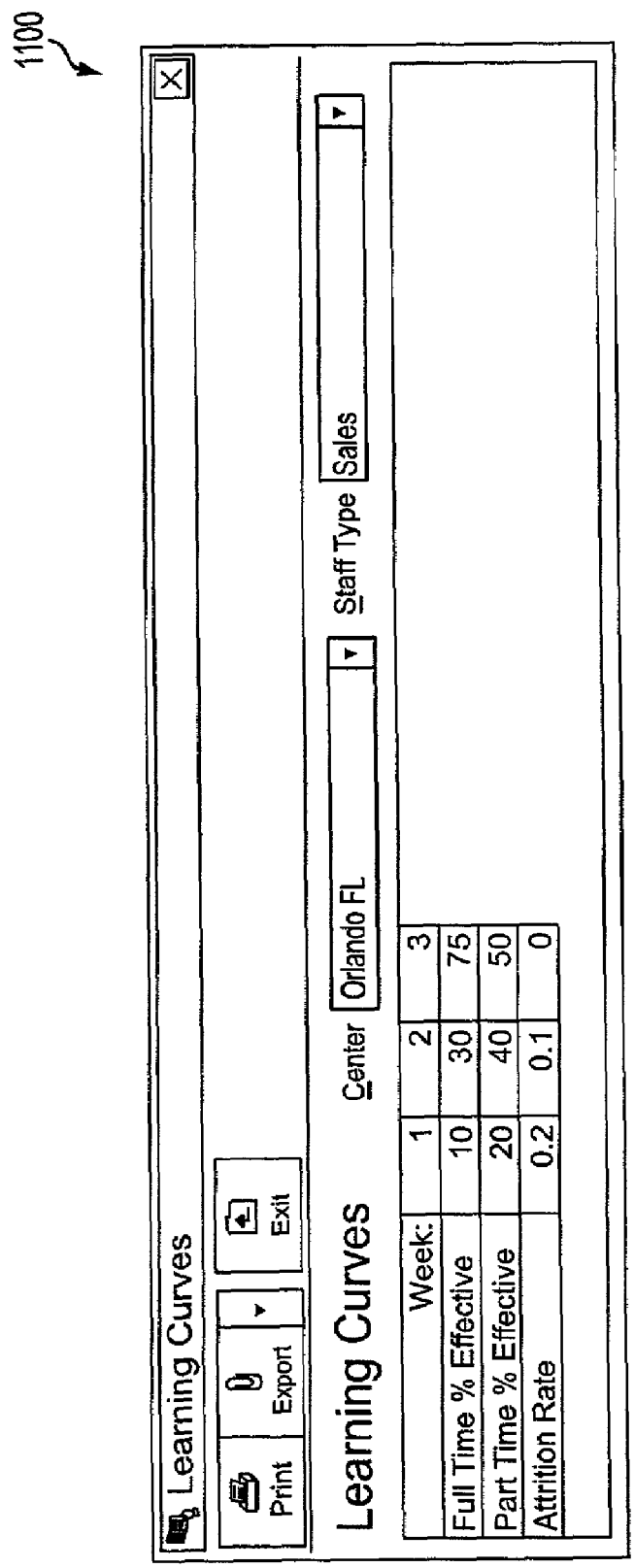
FIG. 11 shows a graphical user interface used to set the attrition rate and effectiveness rate of new hires.
Figure 12B:
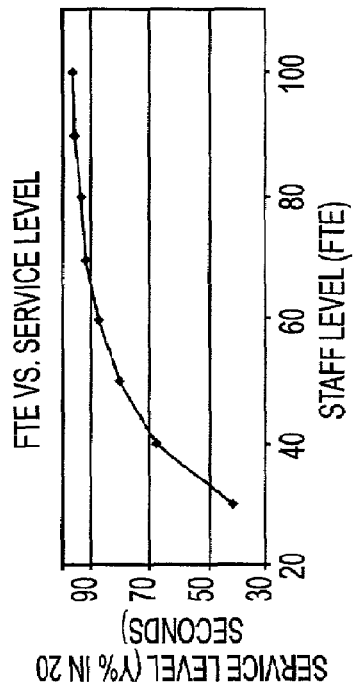
FIGS. 12A-12D show exemplary graphs that may be generated by executing an analysis process.
Figure 12D:
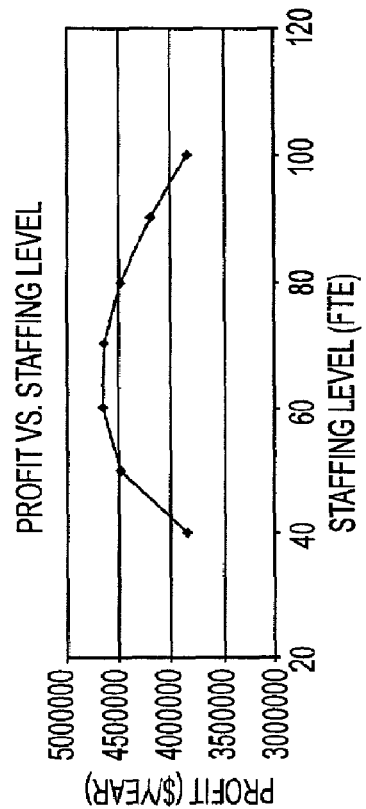
Figure 12A:
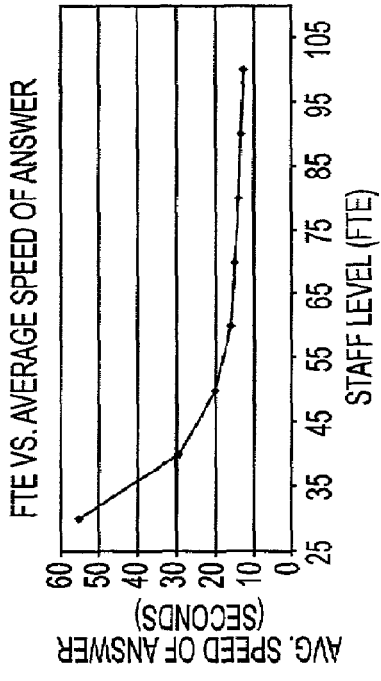
Figure 12C:
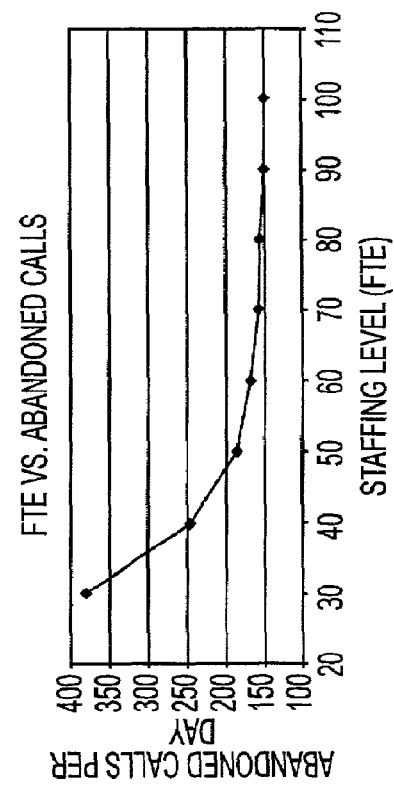

The number of effective full time CSRs for the month must also be modified by the number of full time new hires. Since new hires are not as productive as seasoned employees, the number of new hires cannot simply be added to the number of CSRs in the calculation above. Rather, referring to FIG. 11, the number of new hires is converted into an effective number of CSRs by multiplying the number of new hires by an effectiveness percentage for each week of the month. The resulting figure is then multiplied by the quantity one minus the corresponding new hire attrition rate for that week. This is repeated for each week in the month and the results are summed. The number of effective full time CSRs from new hires is then arrived at by dividing this sum by the number of work weeks in the month. For example, assuming 4 new full time hires, 4 work weeks in the month, and the effectiveness and attrition rate values shown in FIG. 11, the number of equivalent CSRs from new hires is equal to: (0.1*4*(1−0.002))+(0.3*4*(1−0.001))+(0.75*4*(1−0)+(1*4*(1−0))/4=2.15. This number is added to the number of effective full time CSRs from transfers and from the currently existing full time staff in order to get a total number of effective full time CSRs for that month: 102.4+2.15=104.55 effective full time CSRs. A user may set the effectiveness and attrition values of the new hires using the interface 1100 illustrated in FIG. 11. The interface 1100 illustrated in FIG. 11 is accessible via the graphical user interface 900 by activating or selecting the learning icon 988 in the toolbar of options 915.

Referring back to FIG. 10, the total number of effective full-time CSRs is multiplied by the number of work days per full time CSR per month to get a total number of Man-Days worked (step 1010). For example, assuming 104.55 effective CSRs and each CSR works 5 days a week, the number of Man-Days worked in April 2001 is 104.55×(21 work days in April)=2196 Man-Days. The total number of vacation, sick, and training days (field 966) is then subtracted from the total number of Man-Days worked (step 1015). For example, assuming 150 vacation/sick/training days, the actual Man-Days worked by the full-time staff during the month is 2196−150=2046.

The exact same analysis is done to determine the number of Man-Days worked by the part time staff. Step 1020 is step 1005 applied to the part time staff. However, in step 1025, the number of effective part time CSRs is multiplied by a blended average of the number of days that the part time CSRs work rather than by the typical 5 days a week of the full-time employees. For example, if 10 CSRs work part time the equivalent of 2 days a week while 15 CSRs work part time the equivalent of 3 days a week, the blended average number of days a week worked by all of the part time employees is $2*(10/25)+3*(15/25)=2.6$ days a week. The result is an equivalent number of Man-Days worked by the part time employees. The number of vacation, sick, and training days for the part time employees is then subtracted from this number (step 1030) in order to get the total Man-Days worked by the part time staff during that month.

The total Man-Days worked by the staff of the management unit is then determined by simply adding the total Man-Days worked by the full time staff to the total Man-Days worked by the part time staff (step 1035). This number is then multiplied by the schedule adherence to get a number that corresponds to the actual number of Man-Days spent servicing calls or waiting on calls (step 1040). Finally, the effective staff (field 972) is arrived at by dividing the actual number of Man-Days spent servicing calls or waiting on calls by the number of days worked per full time CSR per month (step 1045). For example, assuming the total Man-Days worked by the full time staff is 2100, the total Man-Days worked by the part-time staff is 800, the schedule adherence is 85%, and the number of full-time CSR work days in the month is 21, then the effective staff is (2100+800)*0.85/21=117.4 (step 1050). This effective staff value is the staffing level scale factor used in conjunction with the other scale factors mentioned below to look up the management unit's performance in response to the contact demand unit in the planning and analysis database.

The calls fields 950 include an inbound call volume field 973, a value per call field 974, and an average handle time field 975. These fields contain the characteristics of the contact demand unit, and the values in the fields may be changed freely by the user. The values in the call volume field 973, the value per call field 974, and the average handle time field 975 correspond to the total monthly call volume scale factor, mean value per call scale factor, and mean handle time scale factors, respectively. These three scale factors and the staffing level scale factor are used to look up the performance of the management unit in the planning and analysis database.

The performance fields 955 display the performance results that are found when using the staffing level scale factor, the total call volume scale factor, the mean value per call scale factor, and the mean handle time scale factor to look up the performance of the management unit in the planning and analysis database. Specifically, the service level field 976 displays a percentage of the total calls that receive service that meets a specified service goal (e.g., 90% of calls have a wait time less than 20 seconds). The average speed of answer field 977 displays the average wait time for the customers serviced by the management unit (e.g., 7.1 seconds). The number of abandons field 978 displays the percent of the total calls that are abandoned by a customer while waiting to receive service (e.g., 2.45% of inbound calls are abandoned while waiting for service). The number of blocked calls field 979 displays a percentage of the total calls that are blocked because there are not enough phone lines to service the incoming call volume. The sales field 980 and profit field 981 provide an estimate of the amount of monthly sales dollars and profit dollars generated by the management unit in servicing the contact demand unit for the given staffing plan. All of these output performance metrics may be generated per hour, per week, and per month by the planning and analysis system 205.

Since the performance outputs (fields 970 and 976-981) are simply looked up in the planning and analysis database using the scale factors (fields 972-975), the user may manipulate most of the values in the fields of the user interface 900. Specifically, the user may freely change the full time staff fields 935, the part time staff fields 940, the schedule adherence field 971, and the calls fields 950 and see immediately the corresponding performance outputs in fields 955. The system also generates performance forecasts by automatically using the scale factors estimated in step 705 as inputs in the input fields for future months.

Additionally, due to the flexibility and simplicity of the database query method of obtaining the performance results, the system is able to work "in reverse" by changing the service level goal (field 976) and/or average speed of answer (field 977) and looking up the staff required to achieve that performance in the planning and analysis database. The resulting staff figures are then shown in the staff fields 935 and 940, accordingly.

The toolbar of options 915 includes various icons that may be selected by the user to accomplish different tasks. Selecting the open icon 982 allows the user to open a previously saved scenario. A scenario may, for example, be defined as simply the specific set of values that appear in the selection fields 902, display options field 905, and analysis fields 910.

Selecting the save icon 983 allows the user to save the current scenario in a machine readable file. The scenario may then be accessed at a later time by selecting the open icon 982.

Selecting the export icon 984 allows the user to save the current scenario in a format that may be used in another application. For example, the scenario may be saved in Microsoft® Excel® format.

Selecting the print icon 985 prints out all of the fields in the user interface 900 and the values stored in them.

Selecting the settings icon 986 brings up another menu that allows the user to add new call centers, add new management units (i.e., staff types), add new contact demand units (i.e., call types), and add new mappings between management units and contact demand units (i.e., call routing).

Selecting the center icon 987 allows the user to access information regarding the attributes of the selected contact center. These attributes include the number of phone lines, the number of workstations, and the call routing strategy.

Selecting the learning icon 988 allows the user to set the learning curves (i.e. efficiency ramp-up) and attrition rates for new hires of the selected management unit. The user sets these values by typing directly into the relevant fields in the interface 1100 or in addition or alternatively, selecting a value in a drop-down menu next to the relevant fields.

Selecting the cost icon 989 allows the user to access the financial information of the contact center. For example, the financial information may include full time and part time staff costs, phone line costs, and overhead costs.

Selecting the optimizer icon 990 allows the user to set the objective function and performance constraints that are then used to determine the optimal hiring and termination plan (step 325 of method 300).

Selecting the analysis icon 991 allows the user to generate graphs and perform risk and sensitivity analysis that show the relationship between any contact center planning input and any performance metric. Examples of graphs that may be produced are shown in FIGS. 12A-12D. The user may select any input to the model (e.g., any of the fields 935, 940, and 950 of the user interface example 900) and a performance output (e.g., any of the fields 955 or field 970) and the system will query the planning and analysis database or the granular performance database holding all other inputs constant except for changing incrementally the user selected input. The corresponding change in the performance metric of interest may then be graphed. Examples of graphs that may be generated include: (1) staffing level against service level, average speed of answer, revenue, number of abandons, and profit; (2) call volume against service level, average speed of answer, revenue, and number of abandons; (3) Mean handle time versus service level, average speed of answer, number of abandons, and profit; and (4) number of phone lines versus blocked calls and revenue.

Since the planning and analysis system 205 can also work in reverse, the user can select some of the model outputs such as service level and average speed of answer and then graph these outputs versus other outputs such as revenue or profit. The system simply looks up the corresponding staffing level required to achieve that service level and average speed of answer and then looks up the output performance metric such as revenue or profit for that staffing level. Examples of graphs that may be generated are shown in FIGS. 13A-13D and may include: (1) service level against cost, revenue, and profit; (2) average speed of answer against cost, revenue, and profit.

Selecting the trends icon 992 allows the user to generate time series graphs of the values of each of the analysis fields 910. These time series graphs may show the values by day, week, or month and may include the actual historic values, the historic forecasted values, and the forecasted future values.

Selecting the reports icon 993 allows the user to automatically generate a series of reports for the given scenario. Specifically, the report icon 993 allows the user to automatically generate trend graphs for all of the different analysis fields 910, risk and sensitivity analysis reports and graphs for all of the various model inputs and output performance metrics, and financial reports including the full time and part time staff costs, the overhead costs, the sales, and the profits corresponding to the current scenario. The reports for the performance scenario may optionally be packaged for electronic distribution, web publication, or conventional paper publication.

Selecting the distributions icon 994 allows the user to change the inter-day, inter-week, and inter-month distributions of the inputs and obtain the corresponding performance outputs. Specifically, the user may change the inter-day, inter-week, and inter-month distributions of call volume, mean handle time, value per call, and after call or case work.

Selecting the help icon 995 allows the user to obtain information about how to properly use the user interface 900.

Multiple windows containing the fields in the user interface 900 may be active at one time. Each window represents a different scenario and, therefore, multiple scenarios may be analyzed simultaneously. This allows the user to immediately see the benefits of one staff planning or budget scenario against a different scenario. Since the performance outputs are determined by a simple query of the planning and analysis database, the user may quickly calculate performance figures for multiple scenarios simultaneously.

The planning and analysis system 205 is typically run by a user who changes the input scale factors causing the system 205 to look up the corresponding performance from the planning and analysis database as discussed above. However, a user may also change the inter-day, inter-week, and inter-month distributions of the inputs and obtain the corresponding performance outputs. This is accomplished by selecting the distributions icon 994. Changing the distributions of the inputs rather than just the scale factors, however, requires that the planning and analysis database be regenerated from the granular performance database using the new distributions (i.e. proceed to step 310 and step 315 in method 300). Once the planning and analysis database is regenerated using the new distributions, the user may query performance results by changing scale factors as discussed above (step 320).

A user may also change the call routing plan of the contact center. Changing the call routing plan, however, changes the workflow relationships between management units and contact demand units, requires regeneration of the planning and analysis database, and may or may not require regeneration of the granular performance database. If the new workflow relationship involves a completely new and different contact demand unit, then a new workflow relationship model must be developed and validated in step 415. The new workflow relationship model is then run over all possible inputs (step 800) and the results are stored in the granular performance database (step 805). Obsolete workflow relationship models are eliminated, and the performance corresponding to these models is removed from the granular performance database. The granular performance data from the new workflow relationship model is then processed into daily, weekly, and monthly performance data and stored in the planning and analysis database (steps 810 and 815). The planning and analysis database may then be queried by selecting scale factors as discussed above.

If the changed call routing plan involves simply a new allocation of management units to a contact demand unit that is very similar or exactly the same as an existing and already modeled contact demand unit, the granular performance database may be left unchanged and the call routing plan may be changed via the settings icon 986. In this case, the new routing plan is simply incorporated into the modeling by using different staff scale factors when looking up the hourly performance from the granular performance database and applying different staff distributions for the new or added management units when rolling up the performance data for storage in the planning and analysis database. This is possible because the granular performance database was generated using workflow relationship models that are particularly dependent on contact demand unit characteristics (i.e., call volume, handle time, and customer patience) and substantially less dependent on management unit characteristics (i.e. staffing and phone lines). Changing the workflow relationships by modifying the management units that service a contact demand unit typically involves just changing the number of staff that are handling that contact demand unit. If the granular performance database has already stored the performance for that new number of staff, that performance may simply be looked up and used as the hourly performance for the new workflow relationship.

As a final alternative, different call routing plans may be identified prior to developing the model of the contact center. Each of the call routing plans is then incorporated into a separate contact center model and a separate granular performance database and planning and analysis database is generated for each individual call routing plan. The planning and analysis system 205 is able to access whichever databases are appropriate for the current call routing plan under analysis by selecting the appropriate call routing plan via the settings icon 986.

The planning and analysis system 205 may determine the optimal hiring/termination plan for the contact center by iteratively changing the hiring and staffing plan and looking up the corresponding cost performance from the planning and analysis database. This approach, however, can be time consuming and difficult. Instead, the planning and analysis system 205 uses an optimization process to determine the optimal hiring/termination plan (step 325 of method 300). While the optimization process described is a linear program, the optimization process also may include a heuristic process or other mathematical optimization processes. Given the objective function of minimizing staff costs and the performance constraint of maintaining a given service level, the process automatically finds the least cost hiring and termination plan that still meet the service level constraints. The objective function and the service level constraints are set by the user via the optimizer icon 990. The process is a linear program). The process, along with the decision variables and constants, are shown below:

Decision Variables:
EffStaff(t)=Effective staff at each time, t
UnderStaff(t)=Number of staff under the required staff at each time, t
FT_Staff(t)=Number of full time staff at each time, t
PT_Staff(t)=Number of part time staff at each time, t
NH(t)=Number of new hires at each time, t Constants:
Penalty=Penalty for understaffing
Required Staff(t)=Number of staff needed to meet the service goals set for each time, t
FT_Att(t)=Attrition rate for full time staff for each time, t
PT_Att(t)=Attrition rate for part time staff for each time, t
LC(w)=New hire effectiveness during learning curve time period, w
LCA(w)=New hire attrition during learning curve time period, w
Adhere(t)=Schedule adherence for time, t
FT % NH=Percent of new hires that were full time during time, t
PT % NH=(1−FT % NH)
PTCSR=Starting part time CSRs
FTCSR=Starting full time CSRs
MaxHires=Maximum number of new hires in a single time period Objective Function: Minimize Staff $$\sum_t (\textit{EffStaff}_t + \textit{UnderStaff}_t * \text{Penalty} + NH_t * \text{Penalty})$$

Subject To:

1. $\textit{EffStaff}_t + \textit{UnderStaff}_t \geq \textit{RequiredStaff}_t$

2. $\textit{EffStaff}_t = \begin{bmatrix} FT\_Staff_t(1 - FT\_Att_t) + PT\_Staff_t(1 - PT\_Att_t) + \\ NH_t(LC_1)(1 - LCA_1) + \\ NH_{t-1}(LC_2)(1 - LCA_2) + + NH_{t-2}(LC_3)(1 - LCA_3) \end{bmatrix} * Adhere_t$ 3. $FT\_Staff_t = \left[ FT\_Staff_{t-1} + (FT \% NH)(NH_{t-w-1})\left(1 - \sum_w LCA\right) \right]$ 4. $PT\_Staff_t = \left[ PT\_Staff_{t-1} + (PT \% NH)(NH_{t-w-1})\left(1 - \sum_w LCA\right) \right]$ 5. $FT\_Staff_1 = FTCSR$ 6. $PT\_Staff_1 = PTCSR$ 7. $NH_t \leq MaxHires$ Finally, the planning and analysis system 205 is able to automatically deliver the plan and analysis to the appropriate individuals and systems (step 330). Specifically, the planning and analysis system 205 sends a call routing plan to the analysts who manage the ACD 110. The planning and analysis system 205 provides the WFMS 115 with the staffing plan which includes staffing levels developed by the user in step 320 and an optimized hiring plan developed by the system in step 325. The WFMS 115 works all of this information into the staffing schedule. The analysis system 205 provides to the HRD 120 and its analyst the staffing plan and the corresponding budget for that staffing plan as estimated in steps 320 and 325. Lastly, the analysis system 205 provides the customer reports generated in step 715 to CIS 125 and its analysts.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly implementing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A number of implementations have been described. Nevertheless, it will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method of predicting a staffing level for a call center system, the method comprising:

electronically accessing a first staffing level for a first time period, the first time period including a series of component time periods;

electronically accessing a staffing level distribution for the first time period, the staffing level distribution for the first time period including a staffing level value assigned to each component time period of the series of component time periods within the first time period;

electronically accessing component call volumes for the component time periods of the series of component time periods;

electronically accessing component average handle times for the component time periods of the series of component time periods;

calculating, using a computer model, an operational performance value for the call center for the first time period by:

using the staffing level distribution to disaggregate the first staffing level into component staffing levels for the component time periods of the series of component time periods, for each of the component time periods, calculating a component operational performance value for the component time period based on a component staffing level for the component time period, a component average handle time for the component time period, and a component call volume for the component time period, and aggregating the component operational performance values to determine the operational performance value for the first time period;

storing the calculated operational performance value in a database;

storing the first staffing level in association with the calculated operational performance value in the database;

after storing the first staffing level and the calculated operational performance value in the database, enabling a user to input, through interactions with a graphical user interface, a first call volume for the first time period and an operational performance goal for the call center, the operational performance goal corresponding to the calculated operational performance value;

using the user-inputted first call volume and the user-inputted operational performance goal to access the first staffing level from the database; and enabling the user to perceive, through the graphical user interface, the first staffing level as corresponding to a staffing level required to achieve the operational performance goal for the call center.

2. The method of claim 1, wherein the staffing level values assigned to the component time periods are percentage values indicating percentages of the first staffing level that are available to service calls during the corresponding component time periods.

3. The method of claim 2, wherein using the staffing level distribution to disaggregate the first staffing level into component staffing levels for the component time periods of the series of component time periods comprises multiplying the first staffing level by the percentage values assigned to the component time periods.

4. The method of claim 2, wherein aggregating the component operational performance values for the call center comprises adding the component operational performance values together to determine the aggregate operational performance value for the first time period.

5. The method of claim 2, wherein aggregating the component operational performance values for the call center comprises calculating a volume weighted average of the component operational performance values to determine the aggregate operational performance value for the first time period.

6. The method of claim 1, further comprising enabling the user to input into the computer model through the graphical user interface the operational performance goal for the call center, and visually displaying, in the graphical user interface, the determined first staffing level for the first time period.

7. The method of claim 1, wherein a duration of the first time period is equal to the duration of the series of component time periods.

8. The method of claim 1, wherein the component time period is an hour or a half hour, and the first time period is one of a day, a week and a month.

9. The method of claim 1, wherein the operational performance goal is one of a service level goal, an average speed of answer goal, and a number of abandoned calls goal.

10. The method of claim 1, wherein the operational performance goal comprises a number of blocked calls goal.

11. The method of claim 1, wherein the operational performance goal comprises a customer service representative utilization goal.

12. The method of claim 11, wherein the customer service representative utilization goal comprises a percentage of time goal that a customer service representative is servicing calls rather than waiting for calls.

13. The method of claim 1, wherein the operational performance goal comprises a sales goal for the call center.

14. The method of claim 1, wherein the operational performance goal comprises a profit goal for the call center.

15. The method of claim 1, further comprising enabling display of a window that includes a graphical element selectable by the user to view and modify the staffing level values assigned to the component time periods of the series of component time periods within the first time period, where the staffing level values indicate percentages of the first staffing level that are available to service calls during the corresponding component time periods.

16. The method of claim 15, wherein the window further includes a display of the first call volume, the first average handle time, the operational performance goal, and the first staffing level.

17. The method of claim 1, wherein the calculating of the component operational performance values for the component time periods occurs without use of Erlang equations.

18. The method of claim 17, wherein the calculating of the component operational performance values for the component time periods uses a discrete-event simulation model.

19. A computer-implemented method of predicting a staffing level for a call center system, the method comprising:
  electronically accessing a first staffing level for a first time period and a first average handle time for a first time period, the first time period including a series of component time periods;
  electronically accessing an average handle time distribution for the first time period, the average handle time distribution for the first time period including an average handle time value assigned to each component time period of the series of component time periods within the first time period; and
  electronically accessing component call volumes for the component time periods of the series of component time periods;
  electronically determining, based on the first staffing level, component staffing levels for the component time periods of the series of component time periods;
  calculating, using a computer model, an operational performance value for the call center for the first time period by:
    using the average handle time distribution to disaggregate the first average handle time into component average handle times for the component time periods of the series of component time periods,
    for each of the component time periods, calculating a component operational performance value for the component time period based on a component staffing level for the component time period, a component average handle time for the component time period, and a component call volume for the component time period, and
    aggregating the component operational performance values to determine the operational performance value for the first time period;
  storing the calculated operational performance value in a database;
  storing the first staffing level in association with the calculated operational performance value in the database;
  after storing the first staffing level and the calculated operational performance value in the database, enabling a user to input, through interactions with a graphical user interface, a first call volume for the first time period and an operational performance goal for the call center, the operational performance goal corresponding to the calculated operational performance value;
  using the user-inputted first call volume and the user-inputted operational performance goal to access the first staffing level from the database; and
  enabling the user to perceive, through the graphical user interface, the first staffing level as corresponding to a staffing level required to achieve the operational performance goal for the call center.

20. The method of claim 19,
  wherein the average handle time level values assigned to the component time periods are percentage values indicating percentages of the first average handle time that reflect the average handle times for servicing calls during the corresponding component time periods.

21. The method of claim 20, wherein using the average handle time distribution to disaggregate the first average handle time into component average handle times for the component time periods of the series of component time periods comprises multiplying the first average handle time by the percentage values assigned to the component time periods.

22. The method of claim 20, wherein aggregating the component operational performance values for the call center comprises adding the component operational performance values together to determine the aggregate operational performance value for the first time period.

23. The method of claim 20, wherein aggregating the component operational performance values for the call center comprises calculating a volume weighted average of the component operational performance values to determine the aggregate operational performance value for the first time period.

24. The method of claim 19, further comprising enabling the user to input into the computer model through the graphical user interface the operational performance goal for the call center, and
  visually displaying, in the graphical user interface, the determined first staffing level for the first time period.

25. The method of claim 19, wherein a duration of the first time period is equal to the duration of the series of component time periods.

26. The method of claim 19, wherein the component time period is an hour or a half hour, and the first time period is one of a day, a week and a month.

27. The method of claim 19, wherein the operational performance goal is one of a service level goal, an average speed of answer goal, and a number of abandoned calls goal.

28. The method of claim 19, wherein the operational performance goal comprises a number of blocked calls goal.

29. The method of claim 19, wherein the operational performance goal comprises a customer service representative utilization goal.

30. The method of claim 29, wherein the customer service representative utilization goal comprises a percentage of time goal that a customer service representative is servicing calls rather than waiting for calls.

31. The method of claim 19, wherein the operational performance goal comprises a sales goal for the call center.

32. The method of claim 19, wherein the operational performance goal comprises a profit goal for the call center.

33. The method of claim 19, wherein the calculating of the component operational performance values for the component time periods occurs without use of Erlang equations.

34. The method of claim 33, wherein the calculating of the component operational performance values for the component time periods uses a discrete-event simulation model.

* * * * *